United States Patent [19]

Bartlett et al.

[11] Patent Number: 4,539,653
[45] Date of Patent: Sep. 3, 1985

[54] FORMATTING TEXT/GRAPHICS USING PLURAL INDEPENDENT FORMATTING MECHANISMS

[75] Inventors: Geoffrey M. Bartlett, Ridgefield, Conn.; James P. Hofmeister; Edward J. Pring, both of Tucson, Ariz.

[73] Assignee: International Business Machines Corporation, Armonk, N.Y.

[21] Appl. No.: 484,032

[22] Filed: Apr. 11, 1983

[51] Int. Cl.³ .............................................. G06F 1/00
[52] U.S. Cl. ................................................... 364/900
[58] Field of Search ... 364/200 MS File, 900 MS File

[56] References Cited

U.S. PATENT DOCUMENTS 3,940,746  2/1976  Vittorelli ............................. 364/900
4,086,660  4/1978  McBride .............................. 364/900

Primary Examiner—Raulfe B. Zache
Attorney, Agent, or Firm—H. F. Somermeyer

[57] ABSTRACT

Machine-implemented text/graphics formatting is based upon a logical page area on a presentation-receiving medium, such as a CRT face, sheet of paper and the like. Named text and graphics receiving areas are selectively assignable to the logical pages of a document being formatted for visual presentation and are addressable and formattable independent of other formatting in any logical page. The named areas are machine defined such that one area can have portions thereof automatically assigned to and presented with any arbitrary number of logical pages. Such areas are managed in a text formatting machine to facilitate formatting headers based upon text contained in a succession of logical pages that are outside the named area. A first class of such named areas is placed upon the page when formatting to the page is ended, while a second class of such named areas is placed on the page in response to a command. The placement of the second class on a page can result in starting formatting new pages. Bleed tabs, annotations, and other typographic niceties are machine formattable using such named areas.

62 Claims, 23 Drawing Figures

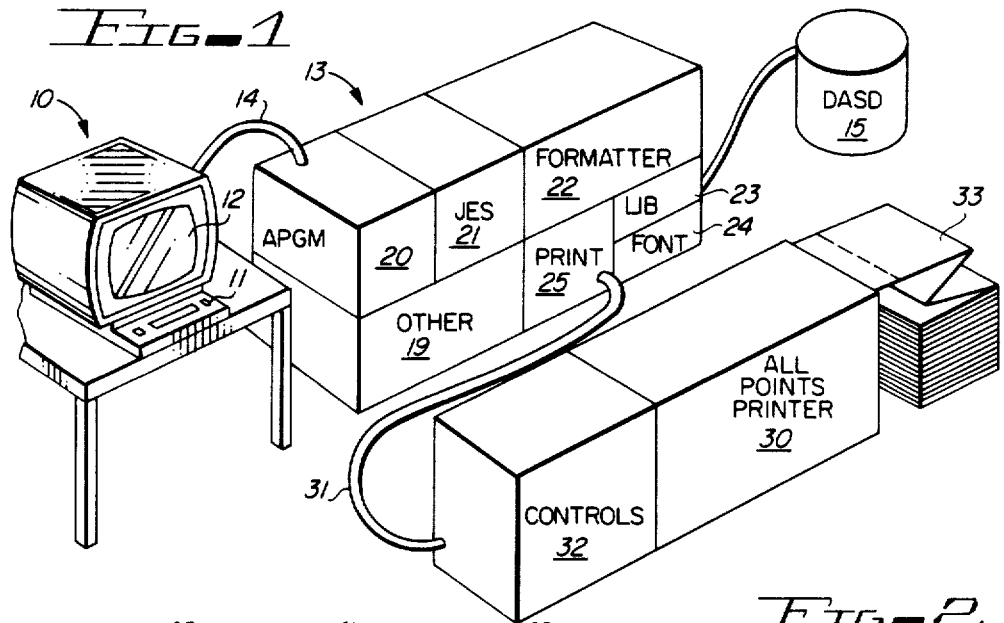
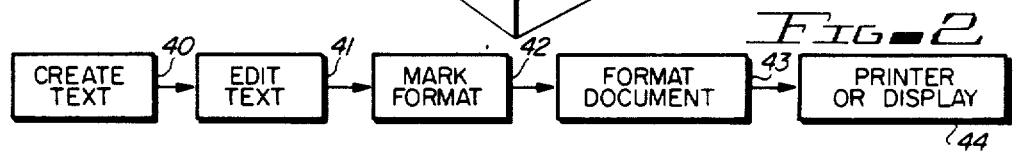
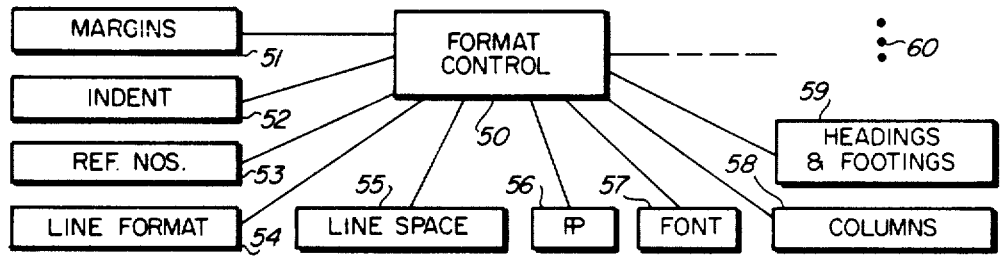
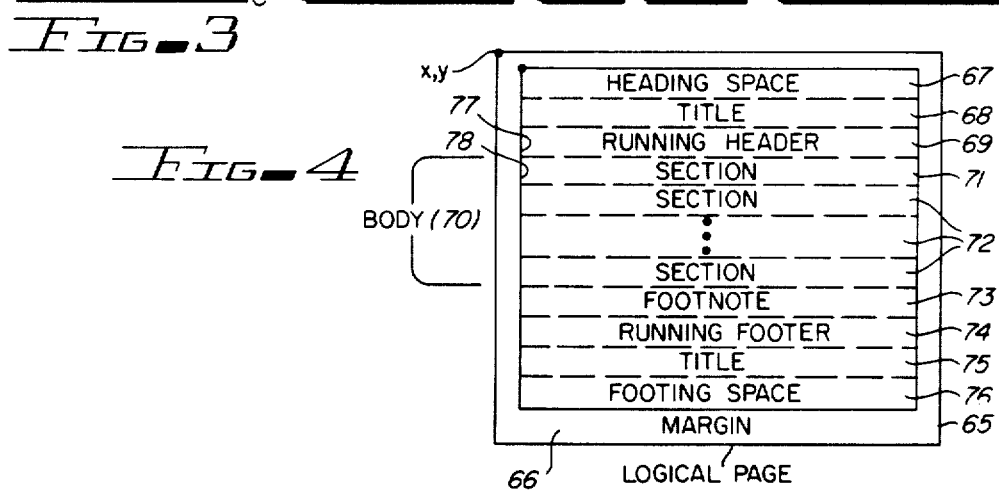

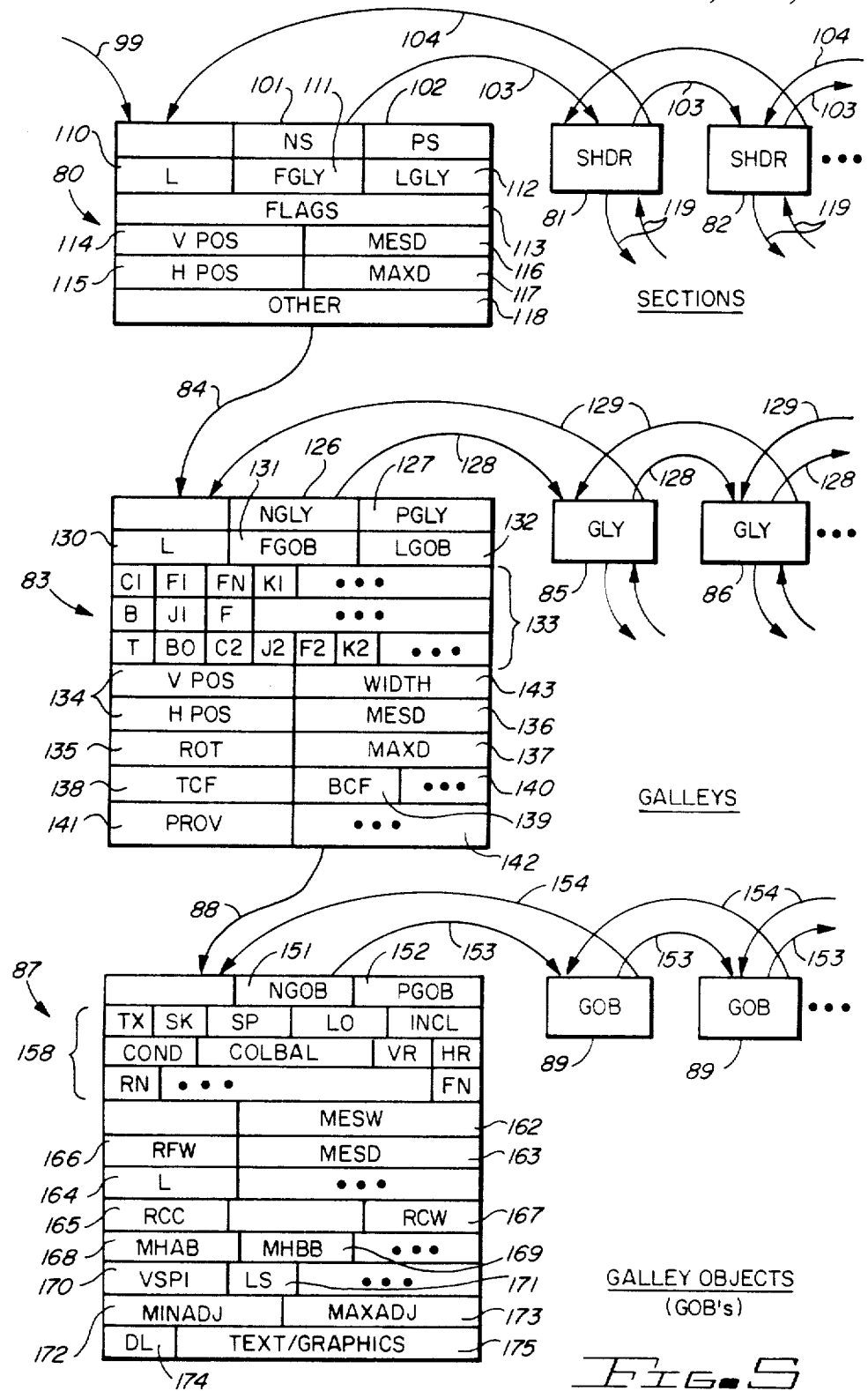

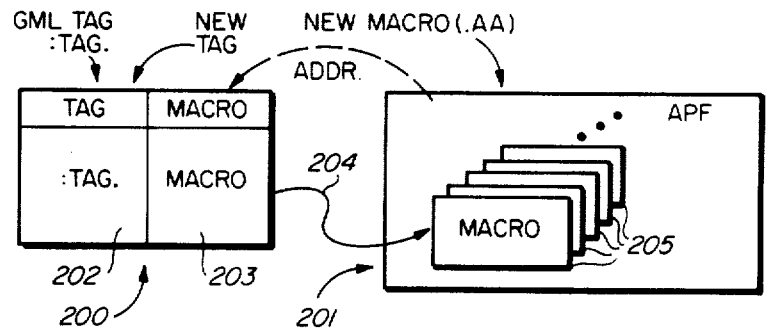
FIG-6
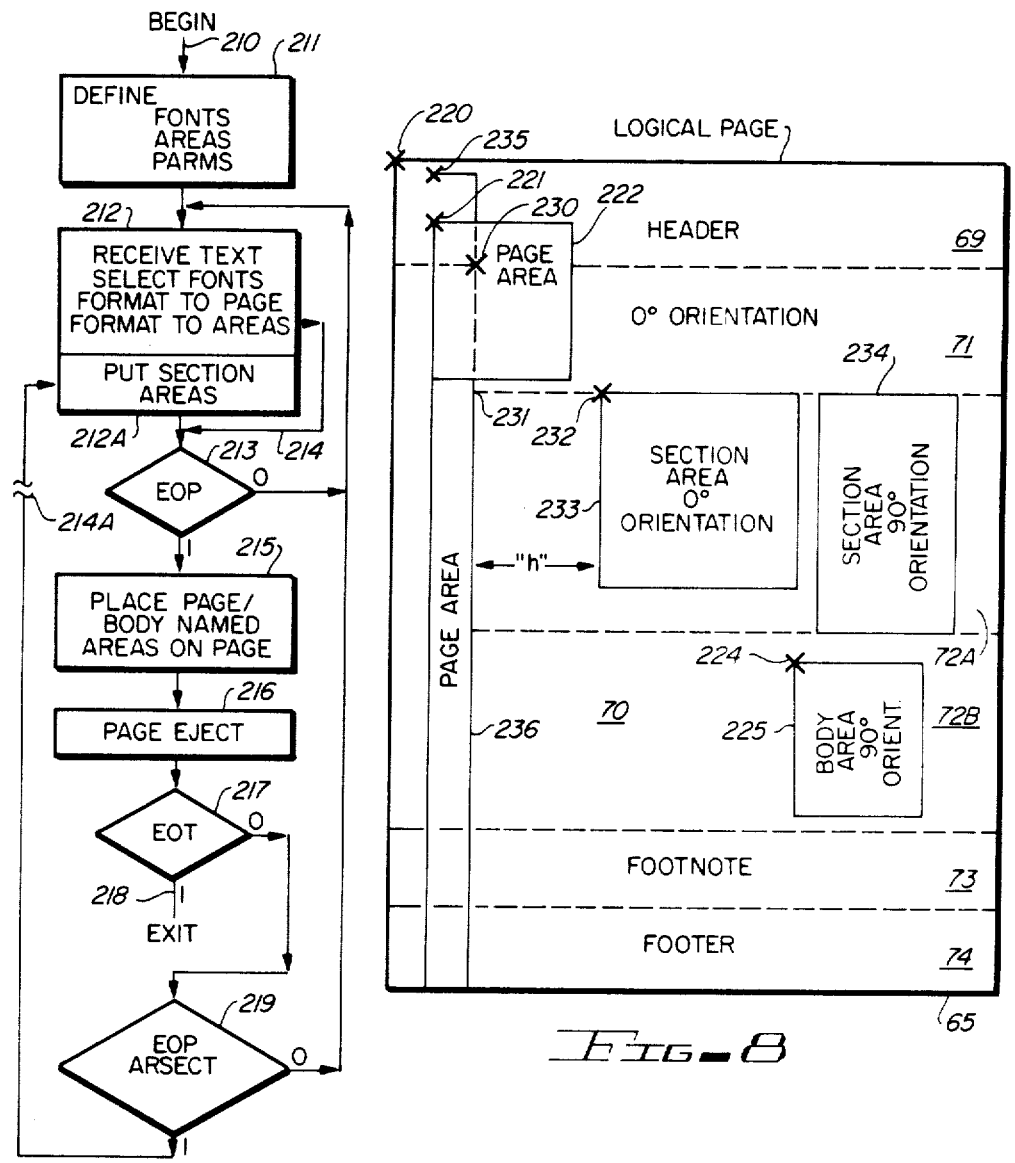
FIG-7
FIG-8

FORMATTING TEXT/GRAPHICS USING PLURAL INDEPENDENT FORMATTING MECHANISMS

DOCUMENTS INCORPORATED BY REFERENCE

IBM Manual SH20-9161-3, *Program Product - Document Composition Facility: Users Guide - Program Number 5748-XX9*, Release 2.

IBM Manual SH20-9188-0, *Program Product - Document Composition Facility Generalized Markup Language: Concepts and Design Guide*.

IBM Manual SH20-1796-1, *PRINTEXT/370 (Programming RPQ EF3414) Text Control/Composition Language Guide - Program Number 5799-ALR*.

IBM Manual GH20-9158-3, *Program Product - Document Composition Facility and Document Library Facility General Information - Program Numbers 57488-XX9 and 5748-XXE*.

FIELD OF THE INVENTION

The invention relates to text composition and formatting, particularly to fully automated formatting employing programmable digital computers.

BACKGROUND OF THE INVENTION

Text composing and formatting has followed a change from fully manual typesetting and editing, to automatic galley (column) formatters, thence to full page composers and formatters. Many text composers are interactive, that is, an operator makes most or all of decisions with the machine carrying out the decisions in an automated manner. Other composers and formatters were programmed on large-capacity digital computers to automatically perform the functions often performed by the operator in an interactive system. Such composers and formatters have been termed "host formatters". Such host formatters respond to embedded composing and formatting commands for converting unformatted text data streams into formatted text data streams usable by document presentation devices, such as printers of all types, terminals, microfiche and other types of information conveying apparatus.

An example of a host galley formatter is the PRINTEXT/370 program available from International Business Machines Corporation, Armonk, N.Y., as program RPQ EF3414, program number 5799-ALR and described in the Program Reference Manual number SH20-1794, 1976. A host page composer has many more functions than a galley formatter. These additional functions result in a more complicated program design. An example of such a page composer is found in the Licensed Program 5748-XX9, Document Composition Facility (DCF), of International Business Machines Corporation (IBM), Armonk, N.Y., and as described in publication numbered GH20-9158 (1978), among others. This program uses embedded commands which are definable using a Generalized Markup Language (GML) as described by W. B. Adams at the International Technical Communications Conference, May 1981, of the Society of Technical Communications, and held at Pittsburgh, Pa. The presentation was published as an article "Playing Tag with Automated Text Processing" in the proceedings of the Society. A more detailed description of GML is found in publications available from IBM identified as SH20-0188, "Document Composition Facility, Generalized Markup Language: Concepts and Design Guide" and SH20-9186, "Document Composition Facility—Introduction to the Generalized Markup Language: Using the Starter Set".

The DCF program enables a computer, or host processor, to format text into "logical pages" which define an area which receives formatted text for presentation on a sheet of paper (form) using a predetermined orientation, size and placement. A plurality of logical pages can be assigned to and printed on one form. DCF also divides each logical page into a plurality of mutually exclusive text and graphics receiving areas, portions, or regions. These areas extend the entire width of the printable portion of each logical page, hence are considered as vertical portions or segments. The order of such vertical segments on each logical page is fixed. Beginning at the top of a logical page, one first encounters a header space, then a title space, a running header, a body portion which is further divided into a plurality of vertical sections, a footnote space, running footer, a title and a footer. Surrounding the vertical spaces is a margin (a nonprintable portion along each edge of a logical page). None of these areas can overlap. Each of the sections in a body can be divided into vertical columns which are fully contained within each such section. This logical page format can extend throughout a document or a portion of a document. Automatic means are provided to change the vertical extents of these areas from one logical page to the next.

When DCF is being executed by a digital computer or host processor, the host processor when combined with a terminal, external data storage and a text output device becomes a highly automated text/graphics composer. While the facilities provided in such highly automated composition provide computer-aided assistance to users, yet more flexible automatic composition is needed for further enabling users greater flexibility and ease in composing and formatting documents and other information-presenting vehicles.

SUMMARY OF THE INVENTION

It is an object of the present invention to provide enhanced flexibility in the automated formatting of text and graphics into logical pages for visual presentation.

In accordance with the invention, a first formatter formats logical pages in mutually exclusive and interdependent text and graphics receiving areas; superposed on such formatter is a second formatter capable of formatting a plurality of selectable named text and graphics receiving areas for such logical page which are automatic and independent of the first-formatter formatted areas as well as being independent of each other. Two classes of named areas provide for an additional independent formatting control.

In formatting a document consisting of a plurality of logical pages, the named areas are formattable on each logical page through selective invocation of the named area for a given logical page; the relative location of the named areas on any of the logical pages is always the same relative to predetermined reference points, but independent of any other parameter. The reference points can shift locations from page to page.

In a specific version of the invention, two types of named areas are employed. A first is for a logical page or a body portion of a logical page, can be placed anywhere on the logical page or body, and is assigned to the logical page after formatting a page, i.e., at the end or eject time of such logical page. The second formatter places text and graphics from these named areas onto a page. A second type of named area is assignable to sections of the logical page which occur within the body portion. Such named areas must reside within the allocated sections of the body, and are placed within the sections by an embedded command in the data stream containing the unformatted data. This control enables the formatted text and graphics to be independently, visually, selectively or nonsequentially presented.

The named areas can be made page specific and can be concatenated for diverse formatting controls.

The foregoing and other objects, features, and advantages of the invention will be apparent from the following more particular description of preferred embodiments of the invention, as illustrated in the accompanying drawings.

DESCRIPTION OF THE DRAWING

FIG. 1 diagrammatically shows a document composer including a programmable digital computer which advantageously employs the present invention.

FIG. 2 is a flowchart showing markup processing for using a document composer of FIG. 1 and which sets the general operational environment of employing the present invention.

FIG. 3 is a diagram illustrating the various functions performed by the formatter portion of the FIG. 1 illustrated document composer.

FIG. 4 illustrates the mutually exclusive portions of a logical page using a first formatter and over which the named areas are superposed in an independent manner.

FIG. 5 illustrates data structure used in formatting text and graphics to a logical page.

FIG. 6 diagrammatically illustrates a so-called generalized markup language (GML) tag system usable with the FIG. 1 illustrated document composer.

FIG. 7 is a flowchart showing the operations of the FIG. 1 illustrated document composer in practicing the present invention in a best mode.

FIG. 8 illustrates a logical page having a plurality of named areas superposed upon the first formatted portion of FIG. 4 and achieved by using the FIG. 1 illustrated document composer.

DETAILED DESCRIPTION

Figure 9:
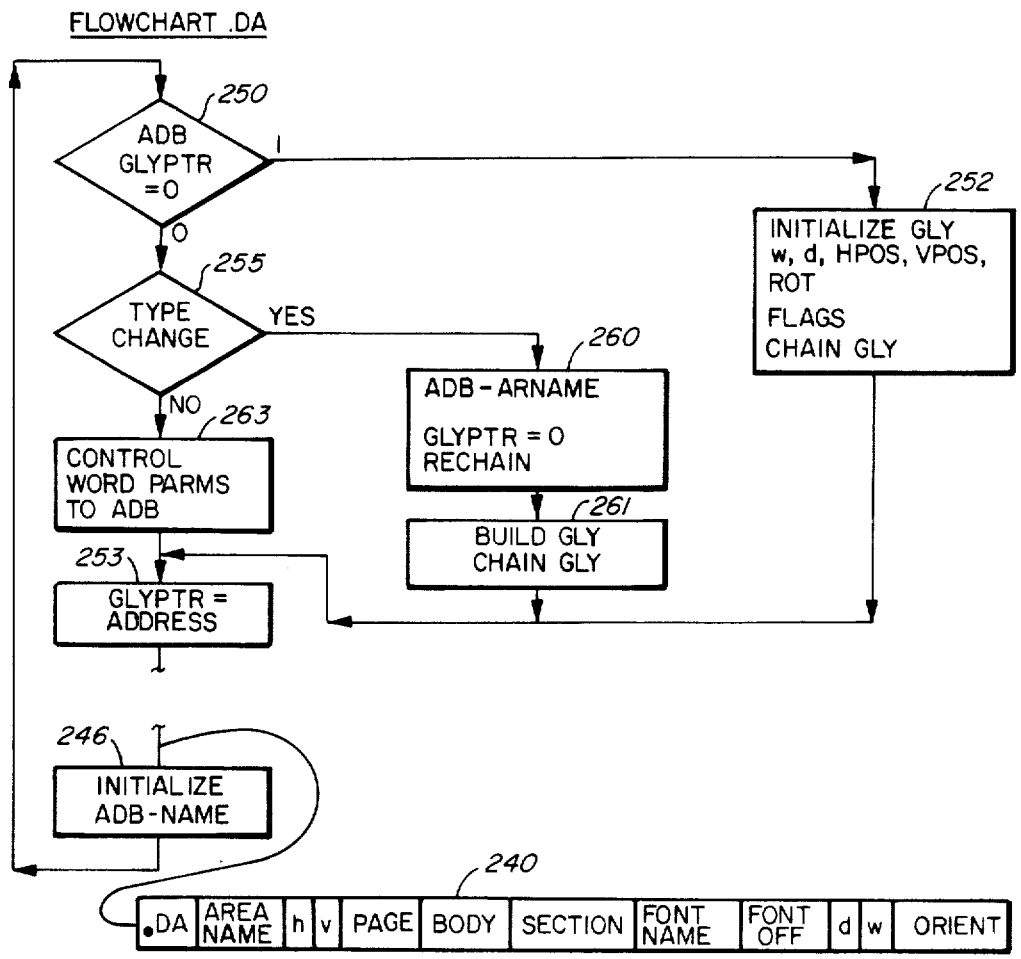
FIG. 9 is a machine operation flowchart used to define or set up a named area in the FIG. 1 illustrated document composer.

Referring now more particularly to the drawings, like numerals indicate like parts and structural features in the various diagrams. The general operating environment of a text processing system in which the present invention preferably is practiced is shown in FIG. 1. An operator interactive terminal 10 has a keyboard and associated graphics display, such as CRT 12. The interactive terminal 10 is suitably cabled to a programmed digital computer 13 via cable 14. Cable 14 also diagrammatically represents any input/output multiplexing communication and channel controls, as are widely practiced in the data processing art. Computer 13 has its own data storage 15, preferably in the form of direct-access storage devices, DASD. The hardware construction of computer 13 follows general-purpose digital computer design, such as used by International Business Machines Corporation, Armonk, N.Y., in machines identified as the 3031, 3033, 3081 and 4300 series, for example. FIG. 1 illustrates computer 13 in a logical form wherein each program of significance to practicing the present invention is shown as an internal block portion of computer 13. APGM 20 is the application program associable with interactive terminal 10. A typical APGM 20, when practicing the present invention, would be an interactive text-editing program of any type. Further, APGM 20 can be a payroll or other form of program which results in printout or display using formattable text and graphics, as will become apparent. A job-entry system, JES 21, interfaces with the usual operating system and is included in other programs 19. JES 21 assigns jobs to various programs in response to job control language (JCL) inputted through interactive terminal 10 or through other means, as is well known. When APGM 20 has completed its functions and desires to have a document composed and formatted, APGM 20 initiates operation of text and graphics formatting by formatter 22. Formatter 22 can consist of a program such as the Document Composition Facility, IBM program No. 5748-XX9. The present invention provides certain enhancements over the formatting capabilities of the Document Composition Facility, Release 2, as described in IBM publication GH20-9158-2 entitled, "Document Composition Facility and Document Library Facility, General Information." The signals representing formatted text and graphics are supplied by formatter 22 to JES 21.

A Document Library Facility, LIB 23, provides for accessing DASD 15 with respect to certain textual and control information usable by the Document Composition Facility or formatter 22. Since the formatter 22 is only concerned with formatting documents, a font program, font 24, provides font information to formatter 22. Generally, formatter 22 will work with identification of fonts rather than the actual font symbols, as represented by raster patterns or vector patterns and as usually stored in DASD 15. Formatter 22, upon completion of formatting a document, including identification of fonts, either independently or via font 24, can initiate print program 25 or store the formatted text/graphics in a DASD 15 file for later retrieval for a printing operation. Print program 25, also termed an output writer, is designed to operate and supply textual and graphics data to an output printer, such as all-points-addressable printer 30. Printer 30 receives commands and data from computer 13 via input/output or peripheral cable 31. Cable 31 diagrammatically represents the input/output channels and attachment circuits usually found in coupling printer 30 to computer 13. An all-points-addressable printer is exemplified by the IBM 3800 printer, Model 3. Such a printer generally has a set of electronic circuit controls 32 for controlling the printer. The 3800 Model 3 printer employs tractored paper, i.e., paper with tractor holes on one or both sides of the paper. Such paper is usually fan-folded to produce a stack of printed output, as at 33. Typically, an all-points-addressable printer 30, if a high-speed printer, may have a burster-trimmer-stacker which automatically processes the printed document. Any type of fast or slow printer or other form of visually presenting a composed and formatted document may be advantageously employed with the present invention.

FIG. 2 is a simplified flow diagram illustrating the general flow of document preparation. At 40, text is created. Typically, this can be through an interactive terminal 10 operating with an application program, such as program 20. Other forms of text can be automatically generated, such as by a payroll program, advertising analysis program, computer simulation program which simulates various physical and logical manifestations, and the like. At 41, the text is edited. Steps 40 and 41 can occur somewhat simultaneously or can be sequential. At 42, the edited text is marked for formatting, such as by the GML (generalized markup language) employed with the Document Composition Facility. Such language is a tag control format marking with enhanced human factors. At 43, formatter 22 formats the document. Formatting a document can occur simultaneously with marking a document. However, in the present environment, the formatting chores are taken from the operator for enabling the operator to perform other functions; formatter 22 has sufficient algorithmic controls to aesthetically format the proposed document. Generalized markup language (GML) commands formatter 22 how to format the document. The formatted document is then supplied to a printer or display, as at 44.

FIG. 3 is a simplified showing of a formatter 22. Generally, a formatter has a format control program 50 which synchronizes the operation and coordinates all of the formatting functions. Various specialized functions are performed by program modules within the formatter 22. For example, margins within a logical page, i.e., an area of a sheet of paper which is defined as a page, are controlled by margin control 51. Indenting paragraphs and inserts is controlled at 52. Addition of reference numerals is controlled by REF NOS 53. Line formatting, i.e., line spacing, hyphens, and so forth, is controlled separately at 54 and 55. Paragraphing controls are handled at 56. Font selection and management is handled at 57. Column justification and setups are handled at 58. Headings and footings are handled at 59. Other functions are indicated by ellipsis 60. All of these functions are designed to operate for defining text and graphics data within the logical page, such as shown in FIG. 4.

Referring next to FIG. 4, the structure of a logical page is illustrated. Logical page 65 is a defined portion of a document presentation area, such as a sheet of paper or display screen. A logical page can be contiguous with, be one-half of, or be any arbitrarily-defined portion of a document presentation area. Generally, location of a logical page within a document presentation area is determined by X and Y (abscissa, ordinate) two-dimensional rectangular coordinate locations. Within each logical page, a margin 66 is interposed between the textual material to be described, and the edge of the logical page. A header space 67 occurs at the top of a text portion of a logical page. A title space 68 is then provided; when a page has no title, then the vertical depth of the title portion is zero. A running header 69 occurs immediately below the title section. The next major section is the body 70 of the text. The body is divided into arbitrary sections 71, 72. The present invention also concerns text formatting within a given section of body 70. Immediately underneath body 70 is footnote 73. Running footer 74 follows the footnote 73. A footer title 75 is provided, followed by the footer space 76.

For automated document formatting, efficient data structures representing the document are manipulated to generate format defining signals. The defining format signals are then sent to the printer or display for presenting the document. For purposes of the present description, those data structures used to describe a section 71 of body 70 (FIG. 4) are described with respect to FIG. 5 as being stored in a plurality of addressable registers. The relationships of these data structures to other section 72 defining data structures are also set forth.

Section 71 is generally defined and identified by a section header 80. Additional sections 72 are similarly respectively defined by section headers SHDR 81, 82. The represented document portion within section 71 has text-graphics-defining data structures chained to section header 80. A first data structure, called the galley definition block 83, defines those document portions termed in the typographic art as a column, float, footnote, keep, header, running footer, widow and the like. For each section, there generally are a plurality of galleys as indicated by numerals 85 and 86. The chaining from section header 80 to galley 83, the first galley of the section, is indicated by arrow 84.

The just-described section header 80 and galley 83 contain control information necessary for printing and formatting the document. Additional control information and the actual text and graphics are contained in galley objects (GOBs), such as GOB 87 which is pointed to and chained to galley 83 as indicated by arrow 88. Of course, for representing any document, there will be a large plurality of GOBs, as indicated by numeral 89. All of the above-generally-described data structures are chained together as will be described in the detailed description of each type of the respective data structures.

Before proceeding further, some of the above-referred-to typographic terms are defined. A column is a vertical section of a logical page separated from other text or graphics by a rule or vertical blank space. A keep is a section of text or graphics, such as a bar graph, which cannot be split for justification, i.e., the keep galley defines text and graphics that must be kept together. Generally, a keep is retained within a column if it is defined as being in that column. A float galley represents data and graphics that must be kept together but can be moved about on the logical page as from column to column. A widow is the start or end of a paragraph or of a column of textual matter that is undesirably short. For example, in a column, one line of text is defined as a "widow", i.e., cannot be left alone in a column; it is usually undesirable to move widow text from associated text header consisting of bold or display type. A footnote is text usually in small type which is a reference to other documents, a further explanation or comment, and is generally placed after the bottom of the body of the logical page. The running footer contains miscellaneous text at the bottom of the logical page, such as page numbers.

The section header 80, as well as all other section headers, are stored in a main memory (not shown) portion of computer 13 at predetermined addresses. A pointer, represented by arrow 99, provides addressability and access to section header 80. A plurality of pointers tie the section headers 80, 81, 82 together to completely identify body 70. NS 101 contains a pointer to the next section. Arrows 103 indicate the address pointing from one section header to a next section header. The chain is doubly linked. A previous section header is indicated in PS 102. In a similar manner, arrows 104 indicate the pointing action from a section PS 102 in one section header to the previous section. PS 102 in section 80 is all zeros as it is the first section header within body 70. In a similar manner, in the last section header, such as one of the section headers 82, when NS 101 equals zero, the section header is the last one in the chain of headers. L section 110 indicates the length of the section header. FGLY 111 is a pointer to the first galley in the chain of galleys appended to the given section header. For example, FGLY 111 in header 80 corresponds to arrow 84 pointing to galley 83. LGLY 112 is a pointer to the last galley in the chain of galleys appended to the given section header.

Flags 113 indicate certain data parameters for the stored text or graphics. The flags are not individually shown but can be easily envisioned from the following description. Such flags indicate, inter alia, whether reference numbering can be required. Other flag controls may also be easily envisioned. Each section header also includes a plurality of so-called section parameters. Such parameters include vertical displacement VPOS 114 which indicates the vertical position of the section in the logical page. For section 71 (FIG. 4), the vertical position corresponds to line 77 which is the Y position from the XY point of the logical page. In a similar manner, HPOS 115 indicates the X or horizontal position. As shown in FIG. 4, the X position corresponds to the left-hand margin, as at 78. In the event section 71 does not extend from left margin to right margin, then other horizontal positions can be used with equal facility. It is preferred that the positioning of the sections within the logical page be accomplished in device units, i.e., PELs (print elements). MESD 116 contains an entry indicating the measured depth of text or graphics currently assigned or formatted in section 71. This number indicates in PELs the actual graphics or text occupancy of section 71. The maximal vertical extent of section 71 is indicated by MAXD 117 which indicates the amount of vertical space within logical page 65 that the text or graphics being formatted for section 71 can occupy. Attempting to format a greater amount of text or graphics to this section requires extraordinary programming control beyond the scope of the present description. Other portions 118 contain other control informational bits as may be desired in a practical document formatting control but which are not necessary for an understanding of the present invention. The general data structure for all of the section headers 80, 81, 82, etc., is identical.

Galley blocks 83, 85 and 86 are all identically constructed and generally follow the format of the just-described section headers. NGLY 126 is an address pointer which points to the storage location within main memory (not shown) of the next galley, GLY 85, with the pointing action represented by an arrow 128. GLY 85 has a similar pointer to GLY 86 which is also represented by an arrow 128. PGLY 127 is an address pointer to the location of the previous galley in the chain. Such previous galley pointing is collectively represented by the arrows 129. PGLY 127 of galley 83 is equal to zero since it is the first galley in the doubly-linked chain of galleys. In a similar manner, the last galley in the chain has this NGLY 126 equal to zero. Note that the first and last galley are pointed to in the section header by FGLY and LGLY 111, 112. In a similar manner, each galley has a first and last pointer to its respective chain of galley objects, GOBs. FGOB 131 points to the first GOB in the doubly-linked chain of GOBs, while LGOB 132 points to the last GOB in the chain. L portion 130 indicates the data length of the galley data structure.

Each galley definition block has a set of flags 133. Flag C1 indicates that the galley is representing column text. Flag F1 indicates the galley is representing float data. Flag FN indicates that the galley is representing a footnote and includes data indicating top, bottom or movable float. K1 indicates the galley is representing keep data/graphics. F indicates a forced column function, i.e., the next column is not balanceable with the present column. Other flags, of course, of this character can identify further types of galleys. The B flag indicates that the columns are balanced. This flag, of course, is useful only when C1 is active. The J1 flag indicates the columns have been vertically justified. The third line of flags includes a T bit for indicating that the columns are to be top justified. The B0 bit indicates columns are to be bottom justified. The C2 bit indicates that the columns are to be centered justified. The J2 bit indicates that the columns have been justified. The F2 bit signifies that the galley refers to a float, while K2 indicates the galley refers to a keep.

Each galley structure includes a plurality of galley parameters. Included is the XY position of the data represented by the galley as recorded in VPOS and HPOS, collectively designated by numeral 134. Additionally, ROT 135 indicates rotational orientation of the text or graphics. This orientation is preferably set forth in degrees of rotation with 0 and 360 degrees being the top of the logical page; the rotation is measured clockwise. The width of the text in device units is indicated in WIDTH 143. MESD 136 indicates the current measured depth of the text/graphics represented by the instant galley. The maximum vertical depth is indicated in MAXD 137. TCF 138 and BCF 139 respectively indicate top and bottom column floats as being the data represented by the instant galley. PROV 141 indicates that the data or graphics represented by the galley is a provisional top column galley. Other indications can be provided within the galley data structures, all represented by numeral 142.

FGOB 131 points to the first GOB 87 chained to galley data structure 83. The GOBs 87 and 89 are doubly-linked chained together in the same manner as the section headers and the galley definition blocks. In each GOB, NGOB 151 points to the next GOB as indicated by arrows 153, while arrows 154 point to the previous GOB from PGOB 152. PGOB 152 in GOB 87 is all zeros, while NGOB 151 of the last GOB of the chain of GOBs is similarly zero. GOB flags 158 indicate the type of GOB and certain text qualifications of the GOB. The TX flag indicates that the other controls relate to text contained in the object or text portion 175. SK flag indicates that a skip is represented by the instant GOB. A skip concerns blank or white space in a formatted document. The depth or duration of the skip is indicated in portion 175, i.e., the number of line spaces for example in a line printer, the number of PELs in an all-points-addressable printer, the number of CRT spots in a display and so forth. SP indicates a blank space in the vertical direction with the amount of space being indicated in portion 175. LO indicates a leadout, which is a point in vertical formatting of a document which can receive additional blank space for vertical justification, as will become more apparent. INCL indicates that the data represented by the GOB includes a page segment (a predetermined text which is addressable as a unit, i.e. by a name) stored in portion 175.

Flags 158 also include GOB qualifiers. For example, COND indicates that some of the functions in formatting are conditional. For example, the skip and space functions may be conditional on predetermined parameters. COLBAL indicates that the instant GOB is a skip added by column balancing format operation (not described). VR and HR respectively indicate vertical and horizontal rules further defined in portion 175. RN indicates that reference numbering is included in this GOB; FN indicates a footnote, as previously referred to in the FN bit of flags 133 of galley 83.

Each GOB has a plurality of GOB parameters. MESW 162 indicates the measured width of the GOB contains text/graphics, while MESD 163 indicates the corresponding measured depth. These measurements can be in device units, such as PELS, character units, line spaces and the like. L field 164 indicates the data length of the instant GOB. Other parameter fields may be included.

Each GOB indicates whether or not a revision code is active. A first revision code RCC 165 identifies a revision code character. RFW 166 indicates the width of the revision code field, while RCW 167 indicates the width of the characters or symbols within the revision fields. In other words, not only can portion 175 contain text/graphics but selectively can provide selected revisions.

The GOB also indicates maximal line height or vertical depth. MHAB 168 indicates a maximal symbol height of a line of text above a defined text base line. In a similar manner, MHBB 169 defines the maximum vertical depth below the above-mentioned text base line. These depths are again defined in terms of PELs or other suitable device interpretable units.

Additionally, the GOB includes vertical justification values usable for controlling vertical justification and balancing of columns. VSPI 170 defines the incremental value for adjusting vertical space. For example, in an all-points-addressable printer, a minimal vertical space increment may be one PEL, two PELs, four PELs and the like. In a similar manner, LS 171 indicates the minimum line space, i.e., the space between two adjacent and successive text lines. In addition, factors are provided for indicating in a percentage or ratio the range of adjustments for various vertical format parameters. For example, MINADJ 172 gives the adjustment factor for minimum vertical depth of text, space and skip. In a similar manner, MAXADJ 173 identifies a maximum factor for adjusting text, space and skip in vertical depth. For example, a font may have a given absolute value for space between the lines, the space when a line is skipped (double spacing), spacing between symbols, spacing between sentences and the like. These values would have a factor of unity. The minimum factor in field 172 specifies the minimum adjustment as a percentage of the unity factor, for example, 0.8. In a similar manner, the maximum adjustment in field 173 can be 1.2 or a 20 percent increase in spacing.

The actual text and graphics contained in the respective GOBs are in field 174 and portion 175. DL field 174 indicates the length of text or graphics in portion 175. Such length is preferably expressed in bytes.

FIG. 6 diagrammatically illustrates the operation of the FIG. 1 illustrated document composer when using the GML tags referred to with respect to FIG. 2. The GML tag is a shorthand notation enabling a user to readily access macro functions defined by a series of control words of the Document Composition Facility (DCF), as will be detailed later with respect to use of the named areas illustrated in FIGS. 8 et seq. A tag is identified in an unformatted data stream by a colon followed by the name of the tag followed by a period. The tag can have any name within a permissible range. A tag directory 200 matches the tag names with a macro address wherein the macro set of DCF control words is stored in area 201 of the data storage portion (not shown) of programmed computer 13. Section 202 of directory 200 contains a list of all of the tags presently defined for use with DCF. Section 203 contains a corresponding list of macro addresses identifying the locations of the program macros corresponding to the tags. A new tag and a new macro can be set up by the DCF control word ".AA", which causes a new entry to be placed in section 202, a new macro to be stored in area 201, with a corresponding address of the macro being stored in list 203. Accordingly, the list 203 points to all of the macros 205, as indicated by arrow 204.

FIG. 7 is a generalized flowchart showing the operation of the document composer of FIG. 1 in utilizing the named-area superposed formatting in formatting documents employing a logical page data structure, as shown in FIG. 4. The first formatter action formats directly to the logical page. The named areas receive formatted text and graphics "outside" the logical page for selective placement on one or more of the logical pages from any one or more named areas in accordance with diverse criteria, as will become apparent. It is to be appreciated that the functions of the document composer are determined by embedded commands. A document composition begins by JES 21 activating formatter 22 to begin formatting operations for a designated job, as at 210. At 211, formatter 22 defines the fonts to be used in the document to be composed from the text received from DASD 15, the named areas to be used in the document to be composed, and other parameters necessary for successful formatting and composition. These definitions are used in step 212 by the formatter 22 during the text format processing of received text. Formatter 22, in executing the functions listed in step 212, not only receives unformatted text and graphics but formats such text and graphics to a logical page. Additionally and independently of formatting to the FIG. 4 illustrated logical page, text and graphics are formatted to selected named areas in an interleaved manner to the formatting of the logical page. This interleaved formatting can include selecting fonts for the logical page and selecting different fonts for the named areas, etc. In step 212, formatter 22 responds to an embedded .AR PUT control word to place all formatted section-type named areas to the logical page being formatted. The .AR PUT control word causes formatter 22 to complete the body section being formatted (end of the section). A new section for receiving text and graphics from all section named areas is started, as will become apparent. At 213, formatter 22 examines whether or not a page is to be ended (EOP) (no more text is to be formatted to the page using the first or DCF formatter). If not, more text is received until a logical page is filled (then, an implicit page eject occurs) or an embedded command indicates end of the page. After end of page is indicated and before page eject, formatter 22 at 215 places page and body types of named areas on the logical page. Placing the page and body types of named areas to the logical page after a logical page is ended allows for a maximal flexibility and independence of formatting for providing enhanced automatic formatting, as will become apparent. The term "placing", as used herein and for the Document Composition Facility (DCF) Licensed Program, means finally assigning formatted text and graphics to a logical page for later visual presentation by a device capable of responding to such formatted text and graphics, such as the IBM 3800 Model 3 high-speed printer. After the page has been formatted and the named areas and other text and graphics are placed on a logical page, formatter 22 at 216 sends the page as a formatted data stream either directly to a data presentation device, such as a printer, cathode ray tube device, and so forth, or to DASD 15 for storage and later visual presentation by such a data presentation device. After each page is sent, formatter 22 at 217 examines the ensuing received unformatted text data stream to see if an end-of-document or end-of-text (EOT) is occurring. At the end-of-text, at 218 programmed computer 13 leaves the formatter 22 program for providing other functions, as is well known in a multiprogrammed environment, using the job entry system 21. At 217, when EOT is not reached, formatter 22 at 219 determines whether the page was ended and ejected based on formatting in accordance with the DCF formatting or on formatting text and graphics from section named areas. A flag EOPARSECT 374 (FIG. 13) being set to unity indicates formatting from section named areas. Accordingly, formatter 22 then returns to the step PUT SECTION AREAS for continuing with the .AR PUT text and graphics processing, as will be later described, via steps 214A. Step 214A starts a new page and places running header, running footer and the like onto the just-started page. Otherwise, formatter 22 proceeds from step 219 to repeat step 212 following the DCF programming.

FIG. 8 illustrates spatial relationships between a selected number of named areas with respect to a logical page 65 having vertical portions header 69, body 70 with three sections 71, 72A and 72B and a footnote 73 and footer 74. Each of these vertical portions is mutually exclusive, i.e., cannot contain text that overlays another portion. The logical page 65 has a reference point 220, arbitrarily selected to be the upper left-hand corner in the portrait orientation of FIG. 8. A first named-area reference point 221, having first vertical and horizontal location ordinates with respect to reference point 220, identifies the upper left-hand corner of page-type of named area 222. Page type named areas can be located anywhere within the confines of page 65 by horizontal and vertical ordinates measured with respect to reference point 220 and independent of any of the portions identified by numerals 69–74. The orientation, type size, typeface and formatting of text and graphics within named area 222 are independent of text and graphics being presented in the remaining portion of logical page 65. Of course, when employing named area 222, the person directing the formatting should keep in mind the relationships of the informational contents of the text and graphics within named area 222 with respect to the informational contents of text and graphics in the immediately adjacent areas of logical page 65. Named-area reference point 224 locates body-type named area 225 with respect to point 230. It has text and graphics with a 90 degree orientation with respect to the portrait orientation of logical page 65. The zero degree orientation of section 71 is the normal orientation of text and graphics in a portrait presentation of logical page 65. Named area 222 overlays a portion of header 69 and section 71 of body 70. On the other hand, body-type named area 225 is contained entirely within body 70 and section 72B; its formatting is independent of the body 70 formatting. For example, if section 72A (because of some formatting requirements) is moved to be contiguous with footnote 73, thereby eliminating section 72B during a formatting operation, such change would have no effect on named area 225. In a multipage document, the location of named areas 222 and 225 is the same in all of the pages within the document. Whether or not text and graphics actually appear on a given logical page as formatted to those named areas 222 and 225 is determined merely by whether or not text or graphics are formatted to such named areas for such logical page. Hence, even though named areas have an independent allocated space in each logical page of a document being formatted, text and graphics need not appear on each and every page based upon such allocations.

The vertical position of section named areas is referenced to the bottom of the immediately preceding body section. When an .AR PUT control word ends a current section, that section becomes the vertical reference for all text and graphics placed on the page from the current section named areas. For example, when section 71 is ended by the .AR PUT control word, the new section 72A is formatted with the section named area text and graphics. The vertical extent of the new section 72A is determined by the lesser of the two vertical distances of a maximum-depth section named area, such as 234, or the remaining distance from the bottom of immediately preceding section 71 to the bottom of the body portion 70 (shown as the top of footnote 73). The horizontal positioning of the section named areas allows a plurality of such named areas to be placed in one body section.

Section named-area text and graphics fills a first area 233 at horizontal location "h" from the left boundary of the body portion 70. A second section named area 234 yields text and graphics having a maximum permitted depth (MAXD 137 of its galley 83 is the largest of any MAXD in any galley for other section named areas). The vertical depth of the body section takes the greatest depth when the remaining body depth permits. In the event that MAXD is small and the text and graphics extent in any one of the section named areas is large, a plurality of body sections will result from recursively processing the section named areas as detailed in FIG. 12. The actual depth of any of the resultant body sections is respectively determined by the largest MAXD in any of the section named areas still having text and graphics to be placed on the page. From a single .AR PUT control word, all text and graphics in all current section named areas (exception is page-specific section named areas as will be described) will be placed on the pages, possibly resulting in a plurality of pages being started and a plurality of body sections being built. The text and graphics in any of the section named areas being placed in the same body section can have independent characteristics (rotation, fonts, etc.), and can overlay other section named area text and graphics in the same body section. Of course, text and graphics from body and page named areas can overlay any of the text and graphics from the section named areas without restrictions.

As shown, named area 233 has a zero degree orientation which is consonant with the orientation of text and graphics in logical page 65 outside of the named areas. Named area 233, for example, could contain a photograph, bar chart, text insert or any other form of graphics. Inclusion of section named areas 233 and 234 within logical page 65 is always by an .AR PUT embedded control word, as opposed to the automatic insertion of the page and body named areas 222 and 225 at the time of ending page formatting in step 215 of FIG. 7. Named areas can also be used for identifying binding areas of the document pages. In this regard, named area 236 is a page-type named area having a reference point 235 with given vertical and horizontal displacements from reference point 220. Page named area 236 can contain reference points (not shown) indicating where holes can be drilled in the document for binding or for other marks which may be used in connection with utilization of a multipage document. In this regard, it should be noted that named areas 222 and 236 overlay each other. Both named areas are still independently formatted, allowing overlaying of graphics based upon independent formatting.

Named areas are implemented in a program formatter 22 through the use of two new DCF control words. A first control word, DEFINE AREA (.DA), sets up or defines the named area; a second control word, AREA (.AR), starts or causes a named area to be formatted within a text or graphics area, such as a logical page, for presentation as will become apparent. A "defined" named area can receive formatted lines of text and image segments independently of other text and images outside the named area. Such text and images within a named area are placed at a defined location on the page in accordance with the definition of such named area. The contents of a named area can overlay text or graphics formatted on the page outside the named area. Once a named area is defined or created, an ensuing area control word .AR indicates to program formatter 22 that the ensuing text and graphics are to be included in the named area. When a named area already has received text or images, then the text or images following the area control word may be added to or may replace the already formatted text and images.

As shown in FIG. 9, each DEFINE AREA control word includes a plurality of control fields and bits. The AREANAME gives the name of the named area now being created. The "h" field contains the horizontal displacement from the left edge of the region (as later defined in the page, body or section) which will receive the named area. When h=0, the named area is placed flush against the left edge of the receiving region. The PAGE, BODY, and SECTION key words, indicate the type of named area being defined. The "v" is a field indicating the vertical displacement from the top of the named area receiving region to the upper left-hand corner of the named area. When v=0, the named area is located flush against the top edge of the receiving region. For named areas to be received within sections, the parameter "v" is ignored. The PAGE field, when set to unity, specifies that the named area is to be positioned relative to a logical page, such as named areas 222 and 236 of FIG. 8. The horizontal and vertical displacements mentioned above locate all page named areas with respect to the upper left-hand corner of the logical page. A plurality of these page named areas can be located anywhere within each logical page. The textual and image contents of the page named areas can overlay running headings and footings as well as body text. Such page named areas, when containing text or graphics, are automatically located on a logical page each time a logical page is "ended" and before it is "ejected", i.e., the usual formatting has been completed. This means that the page named areas are placed on a logical page after other text and graphics have been selected by the first level formatting for placement onto a logical page.

The BODY field, when set to unity, specifies that the named area being created is to be located relative to the body portion of the page, such as named area 225 of FIG. 8. The horizontal and vertical displacements locate the body named areas with respect to the upper left-hand corner 230 of the body portion of the logical page. Body named areas are locatable anywhere within the body portion; the contents of these named areas can overlay body text or other named areas. The body named areas do not overlay running headings or running footings. Like page named areas, body named areas are automatically located each time a logical page is ended; their locations on a logical page shift with the location of the body portion (page location is relative rather than absolute).

The SECTION field, when set to unity, specifies that the named area being defined is located within a given body section. Generally, section named areas are contiguous with the section extents. The horizontal displacement "h" indicates the location of the named area from the current bind edge of the logical page. The current body section is that section within the body that is now being formatted. Section named areas are not automatically placed within a section. An embedded AREA control word with a PUT function activates formatter 22 to place all section named areas to the current and the immediately succeeding logical pages. When any such section named areas have a text or graphics extent greater than that placeable on the current page, then new pages are started as necessary for receiving the overflow from such section named area.

The FONTNAME field identifies the initial font to be used in formatting text characters in the named area. If FONTNAME is omitted, or if FONT OFF is specified, then any previous font specified for the named area is deleted. If there is no initial font specified for a named area being defined, the current font used outside the named area for formatting text is used for the named area at the time the named area formatting is started by an AREA (.AR) control word. In other words, a named area font can be specified by control parameters outside of a named area.

The depth "d" parameter contains an indication of the maximal depth of the named area. The maximal depth is normally expressed in vertical space units of a device for presenting the document being formatted. Generally, no more than the specified maximal depth will be placed on any given logical page or section. When no depth is given for a named area or when a specified value exceeds a maximum available value (i.e., would logically extend beyond the bottom of a section, body portion or logical page), then the maximum available space within the receiving region will be substituted for the value specified in the "d" field. For example, in page named areas, the maximal depth is the vertical distance from the position on the page specified by the parameter "v" to the formattable bottom of a logical page. In a similar manner, for body named areas, the maximal depth is the distance from the position of the named areas specified by the parameter "v" to the bottom of the body. Likewise for section named areas, the maximal depth is the distance from the bottom of the immediately preceding section to the bottom edge of the body portion. If text and graphics remain in a section named area beyond the specified or maximal allowable depth used in formatting the named area text and graphics to the logical page, the remaining or overflow text and graphics are placed into the next succeeding pages to be formatted. On the other hand, the later-detailed truncation function for page and body named areas is useful in formatting contents of such named areas to a plurality of logical pages or other receiving regions for creating headings and the like, as will become apparent. When formatting text and graphics to a named area, the formatting operation ignores the depth parameter, i.e., the named area is virtually bottomless for receiving an indeterminate extent of text and graphics. Then, as the named area formatted text and graphics are placed on the logical pages, the depth parameter causes formatter 22 to select the formatted text and graphics for each logical page in accordance with the depth parameter. Named areas can be made "page specific"; in such named areas, all formatting is limited by the depth parameters (see FIGS. 19-21).

The width "w" field identifies the initial width of the named area. When width is not specified, the width of the named area defaults to the current column width at the time the named area being defined is started by the later described AREA control word. In other words, a named area can be created with the characteristics of the named area being implicitly determined by parameters external to the area at the time the named area is being formatted to given receiving region. This functional parameter yields additional flexibility in formatting control.

The ORIENT (also termed ROTATE) field defines a rotational orientation of the graphic contents of the named area by arbitrary and capricious selection. In an early implementation of the invention, orientation is limited to a multiple of 90°; such as 0°, 90°, 180°, 270°, −90°, −180° or −270°.

Embedding a DEFINE AREA control word within a text data stream also terminates a keep text unit, float text unit or a footnote. Named areas can be defined or created which overlap other named areas. When such overlap is employed, particular attention should be given to the presentation results. Section named areas may overlap with other section named areas in the same section and can be overlapped by page and body named areas. It is preferred that section named areas occupy complete sections; this arrangement tends to prevent body text outside a named area from inadvertently overlapping section named areas.

A named area not only can be used for text and graphics to be presented but also can be used for identifying other parameters for document presentation. For example, guide marks for positioning binding holes can be specified using named areas such as in named area 236. Including a named area in a running header can enable marking each and every logical page for headnotes, etc. A pair of named areas can be defined to facilitate formatting parallel translations of text in different languages. Rotation of named area contents facilitates creating location thumb tabs for chapter headings and the like.

The AREA control word .AR activates formatting text and graphics to a named area previously defined by .DA. Generally, the named areas are defined at the beginning of the text stream, such as at step 211 of FIG. 7, no limitation thereto intended. Whenever text is to be incorporated into a named area, the AREA control word indicates to the automatic formatter 22 that ensuing text is to be inserted into the identified named area. The AREA control word 241, FIGS. 10 and 10A, includes AREANAME corresponding to AREANAME used in the DEFINE AREA control word. The ON bit instructs the formatter to start formatting into the named area. If the named area already has text or graphics formatted into the named area, then the newly added text is added after the existing text; i.e., as viewed on a page of text, the new text is formatted below existing text. However, if the TOP bit is set to the active condition, then the new text is formatted above or before any existing text. The replace (R) bit indicates that text existing in the named area is to be deleted (provided it has not already been placed on a page); then the new text is formatted into the designated named area. The R bit facilitates updating headings and the like that are placed on pages or where repagination results in shifting the text between pages. The delete (DELE) bit, when active, tells the automatic formatter to delete text that may have been positioned in the named area but which has not been assigned or placed on a page. No new text is added to the named area. The OFF bit ends formatting to a named area. The OFF bit being active is an explicit ending of formatting in a named area. An AREA control word starting formatting to a different named area implicitly ends formatting to a current named area. The PUT bit being active indicates to formatter 22 that all section named areas containing text are to be placed on one or more pages. The AREANAME parameter is not used with the PUT bit. A so-called "section break" also occurs, meaning that the formatter is terminating action on the section being formatted such that it cannot be further changed. A "section break" instituted by other means does not place a section named area to the section. Accordingly, the named area being activated can become a new section within the body of text. If the material in section named areas will not all fit in one section as defined for the body receiving the section, then as many consecutive new sections as required will be created and formatted, each new section receiving as much text as it can until all section named areas are placed in the body of the page(s) of text. The automatic formatter 22 then returns to formatting text outside of the named areas. This control word also ends formatting a text keep, float or footnote and can implicitly start a new logical page to be formatted.

Formatting to a named area can be implicitly terminated by control words that have no text formatting functional relationship to formatting a named area. Such control words are those controls which alter page or column definitions, such as column begin (.CB) or a page eject (end formatting to a page of text, .PA). Accordingly, formatting to a named area can be either stopped explicitly or implicitly.

Page named areas and body named areas are automatically inserted into pages, whereas the section named areas are placed within the body of the text only by the explicit control word .AR PUT. Also, the DCF symbol attribute &AD' activates automatic formatter 22 to determine how much text material a named area contains that is yet to be placed on a page of text.

Formatting named areas is mutually exclusive with formatting a text keep, float or footnote; however, the text contents of the named area can overlay the logical page areas occupied by a keep, float or footnote; this illustrates the independence of the named area control with respect to formatted text outside of named areas on the given logical page. When a named area is being formatted, the formatting functions outside of the named area on the given page of text are interrupted and preserved such that, upon completion of the formatting to the named area, either implicitly or explicitly, such interrupted formatting functions are automatically resumed. The usual program interruption techniques are employed for this control; hence a detailed discussion thereof is dispensed with. For example, in the prior DCF page composing program, footnotes are formatted in an interleaved manner with respect to formatting the body of text. When a control word .FN on is encountered in the text stream, the program environment of the body formatting is saved. Then the footnote is formatted. The control word .FN off stops the footnote formatting, and causes the formatted footnote text to be saved for insertion in the footnote area of the logical page. Then the saved program environment is restored so that body formatting continues. Implicitly terminating a text keep occurs when a text float is started by the .FL on control word. Similarly, text float formatting is terminated when a control word .KP on starts formatting a text keep. Either a text keep or text float formatting is terminated implicitly by an implicit page eject. The control word ".HI . . . " starts formatting to a header—i.e., a new logical page must be started. This control word not only implicitly ends a logical page but also terminates formatting to either a text float or text keep. In a similar manner, formatting to a named area terminates formatting to a text float or keep and is interleaved with the formatting areas outside the named area the same as footnote formatting is interleaved with other formatting. Formatting to a named area implicitly terminates formatting to another named area.

Figure 11:
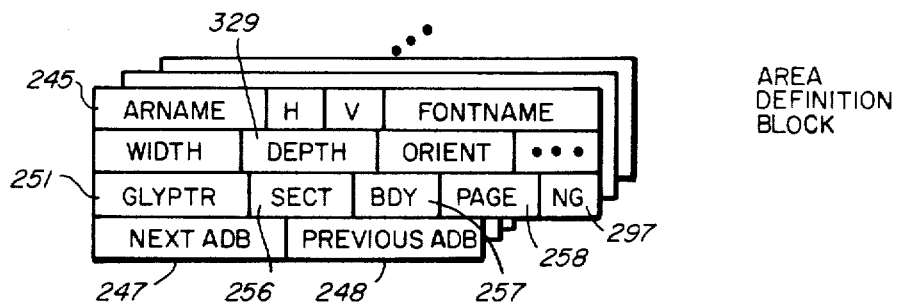
FIG. 11 is a block diagram of a named area definition block or set of registers usable by the FIG. 1 illustrated document composer in conjunction with the FIGS. 9 and 10 illustrated machine operation flowcharts.

FIG. 9 details the machine operations of formatter 22 for responding to a DEFINE AREA control word 240, which results in building or creating an area definition block in the addressable registers shown in FIG. 11. Formatter 22 responds to an embedded DEFINE AREA control word by initializing at step 246 the area definition block ADB, as shown in FIG. 11, by first allocating data storage space (addressable registers) in a usual manner. AREANAME is inserted in the register ARNAME 245. The area definition blocks are doubly linked. Initialization at 246 includes inserting the allocated space into the doubly-linked list by identifying the next ADB and the previous ADB in registers 247 and 248. Generally, a new ADB is appended to the end of the doubly-linked chain. On occasion, a DEFINE AREA control word 240 will be received when a corresponding ADB already exists. In that case, the formatter 22 updates the existing ADB to the parameters included in the control word.

Formatter 22 at 250 examines the ADB to determine whether or not the galley pointer GLYPTR 251 is equal to zero. If it is non-zero (a named area galley 83 already exists), this means that the previous creation of the ADB may have resulted in text already being formatted to the defined named area. If GLYPTR 251 is zero, then a galley, such as a galley 83 of FIG. 5, is initialized for the named area. Within the galley, the width register 143 receives the "w" parameter, MAXD register 137 receives the "d" parameter, HPOS and VPOS register 134 respectively receive the contents of the "h" and "v" parameters of control word 240. ROT 135 receives the rotational information from the ORIENT field of control word 240. The other flags such as PAGE, BODY and SECTION type are inserted into flags 133 (not shown in detail in FIG. 5); then the galley is chained to the ADB by inserting the address in data storage of the just-initialized galley into GLYPTR 251 of FIG. 11. This action completes execution of the control word 240 for a new named area.

When an existing named area is being modified, or redefined, via the DEFINE AREA control word, then formatter 22 leaves step 250 to step 255 for examining control word 240 to see if the type of named area is being changed. That is, the area name ARNAME 245 ADB may have a SECTION, BODY or PAGE active indicator, respectively 256, 257, or 258. Then, if the current named area ADB is indicated as being a page named area (page=1) and control word 240 indicates it should be a body named area, formatter 22 proceeds from step 255 to step 260 for saving in memory the contents of the previous named area for later placement on a page and for generating a newly-defined named area. Once a named area is redefined, no more text or graphics can be added to it. At 260, formatter 22 resets GLYPTR 251 to zero and rechains the ADB to one end of the chain of ADBs by resetting NEXT ADB register 247 and PREV ADB register 248. Then at 261, a named area galley 83 is built as described for step 252, and such galley is chained as previously described to the modified ADB. Then at 253, the address of the just-initialized galley is set into GLYPTR 251. This completes processing of a DEFINE AREA control word which substitutes one named-area set of parameters for a previous set of parameters for a named area having the same name.

If there is no change in the type of named area, then formatter 22 leaves step 255 for executing step 263, which updates the various parameters in the ADB with the parameters included in control word 240. Then, step 253 completes the formatter 22 execution of the embedded control word.

Following execution of the control word, formatter 22 can define additional named areas, define fonts, and set up parameters, all within step 211 of FIG. 7. Then the formatting of the logical page proceeds in step 212 such that formatting of the named area is interleaved with the other formatting, as next explained with respect to FIGS. 10 and 10A. A DEFINE AREA control word can be received during the formatting operations of step 212. Such receipt does not actively initiate formatting of the named area. The AREA control word ".AR" always initiates such formatting.

When formatter 22 is receiving and formatting text and graphics to a logical page in step 212 of FIG. 7, an AREA control word ".AR" may be received with the unformatted text data stream. Then formatter 22 performs the machine operations shown in FIGS. 10 and 10A. First, formatter 22 sequentially scans the parameters 270 contained in control word 241. The named area indicated in the control word field AREANAME will be processed in accordance with parameter 270. Formatter 22 at 271 first examines the ON bit for determining if formatting to the indicated named area should begin. If this is the case, formatter 22 proceeds from step 271 to step 268 for checking if another named area was being formatted by sensing the NA bit 375 (NA=1 indicates a named area is being formatted) shown in FIG. 13. The .AR ON control word implicitly terminates formatting text and graphics to another named area; therefore, formatter 22 in step 269 "ends" the current named area by executing the later-described steps 301. After steps 268 and 269, formatter 22 examines the ADB of FIG. 11 for the indicated named area. At step 272, formatter 22 tests the value of GLYPTR 251 of the examined ADB indicated by AREANAME. If GLYPTR 251 equals zero, a galley is created at 273 based upon the parameters stored within the examined ADB using the same procedures as described for step 252 of FIG. 9. The resultant galley 83 is chained to the ADB via GLYPTR 251.

From steps 272 or 273, formatter 22 at 275 determines whether or not it is currently formatting a logical page (current page). This is done by examining flags (not shown) used with the prior DCF Licensed Program which indicate whether or not a logical page is currently being formatted. If a page is not currently being formatted, then at 276 formatter 22 starts formatting a page by setting the above-mentioned flags; otherwise, step 276 is omitted. At 277, the galley created at 273, or initialized as described with respect to FIG. 9, receives all of the parameters stored in the AREANAME indicated ADB. Also, formatter 22 saves the contents of a work buffer (not shown) used with the DCF Licensed Program, as described earlier, for reinstituting the first level formatting using the FIG. 4 illustrated logical page arrangement. These actions complete the execution of the control word .AR with the ON parameter. Then, formatter 22 follows logic path 278 to format text and graphics to the indicated named area, using the formatting mechanisms that are also used to format the logical page shown in FIG. 4 or any portion thereof. That is, the named area formatting can follow the same rules and procedures as any other formatting.

When formatter 22 finds the parameter ON not being active, it proceeds to step 280 to determine whether or not the DELE bit is active, which indicates deletion of the contents of a named area. When deletion is indicated, formatter 22 at 281 takes all of the allocated galleys and GOBs in FIG. 5 that are anchored to GLYPTR 251 of the FIG. 11 illustrated ADB, indicated by AREANAME, to be deallocated or freed. This action makes the contents of those areas unaddressable, i.e., effectively erases the informational content of the indicated named area. From step 281, formatter 22 proceeds along logic path 282 for examining the next control word embedded in the unformatted text data stream, in accordance with the machine operations used for DCF Licensed Program.

If formatter 22 finds DELE not active at 280, it then examines the R bit at 285. If R is active or equal to one, formatter 22 at 286 examines the indicated ADB to determine whether or not the GLYPTR is equal to zero. If GLYPTR is equal to zero, then formatter 22 proceeds to step 273, et seq., as previously described. Otherwise, when GLYPTR is not equal to zero, formatter 22 at step 287 moves all of the galleys and GOBs indicated by GLYPTR 251 of the indicated ADB to be deallocated or freed as described for step 281. From step 287, formatter 22 proceeds to steps 275, et seq., as previously described for formatting new text and graphics to the named area which replace the original text and graphics.

If formatter 22 finds the R bit not active at 285, then at 290 it examines the TOP bit. This bit indicates that text and graphics received in the unformatted text stream subsequent to the current AREA control word are to be placed at the top of the named area above any currently formatted text and graphics. For a TOP insert, formatter 22 at 291 examines the indicated ADB GLYPTR field 251 to see if it is zero. If it is zero, a new galley is created at 292 as previously described for step 251 of FIG. 9 and chained to the indicated ADB by inserting its storage address into GLYPTR 251. The bit NG 297 (FIG. 11 ADB) is set to unity for indicating a new galley. If GLYPTR 251 is not zero, step 292 is not performed. Then at 293, formatter 22 examines the previously described DCF flags to see if a logical page is currently being formatted (on page), i.e., has a set of galleys been set up for presenting information on a logical page. If not, a page is started at 294 using the procedures referred to at step 276. Then at step 295 formatter 22 determines whether or not there is any text or graphics existing in the designated named area. For existing text, the ensuing text and graphics are first formatted into a "keep aside"(similar to separately formatting a footnote) and then placed as a "keep" at the top of the existing text in the named area. Otherwise, without any text or graphics in the named area, the ensuing text and graphics are formatted directly into the designated named area. The lack of text and graphics in the named area is determined by examining bit NG 297 of the appropriate ADB to determine if it is a new galley (no text in new galley). If the galley existed prior to step 292 (which set NG), formatter 22 then checks the galley 83 field FGOB 131 (FIG. 5), pointed to by GLPTR 251 (FIG. 11). If FGOB is zero, the galley is empty (MT). For either of the two conditions, the ensuing text and graphics are formatted directly to the named area at step 279. Otherwise, existing text or graphics in the named area require formatter 22 at 296 to set up a temporary galley, called a "keep aside". Bit KA 377 (FIG. 13) is set to unity to show that a keep aside was created. Formatter 22 then formats (step 279) the ensuing text and graphics to the keep aside for later insertion into the named area, such as when the named area formatting is completed as indicated by the control word .AR with the OFF parameter active. After formatting the ensuing text and graphics, formatter 22 will encounter additional control words as indicated by logic path 282 and labelled GET NEXT CONTROL WORD. The formatting is explicitly terminated by the .AR OFF control word or implicitly by an .AR ON control word or other control words which formatter 22 recognizes as being inconsistent to formatting text and graphics into named area.

When formatter 22 in executing an AREA control word finds the TOP parameter at 290 not being active, it examines the OFF parameter at 300. The OFF parameter indicates that no more text and graphics are to be formatted to the current named area (AREANAME can be omitted). When this is the case, formatter 22 proceeds to steps 301, which check for a keep aside and restores formatting by restoring the buffer saved at 277. Steps 301 are also performed when named area formatting is implicitly terminated. From step 305, formatter 22 returns to control word execution as previously described for steps 268 and 269.

Formatter 22 at 302 examines to see whether or not a keep aside (KA=1) was set as at step 296. If a keep aside was initiated, it is known that such text and graphics formatted to such keep aside resulted from a previous control word having a TOP parameter detected at step 290, and the indicated named area already contains text or graphics. Accordingly, formatter 22 at 303 puts all of the text and graphics formatted into the keep aside at the top of the area indicated by AREANAME. Then at 304, the keep aside galley 83 is cleared in the manner described for steps 281 and 287. Both bits NG 297 and KA 377 are cleared to zero. With no keep aside (KA=0) at 302, formatter 22 goes directly to step 305. At 305, the data stored in the DCF save area at step 277 is returned to the buffer using the DCF Licensed Program prior programming techniques. Then formatter 22 follows logic path 282 for examining the next control word embedded in the unformatted text data stream.

Figure 13:
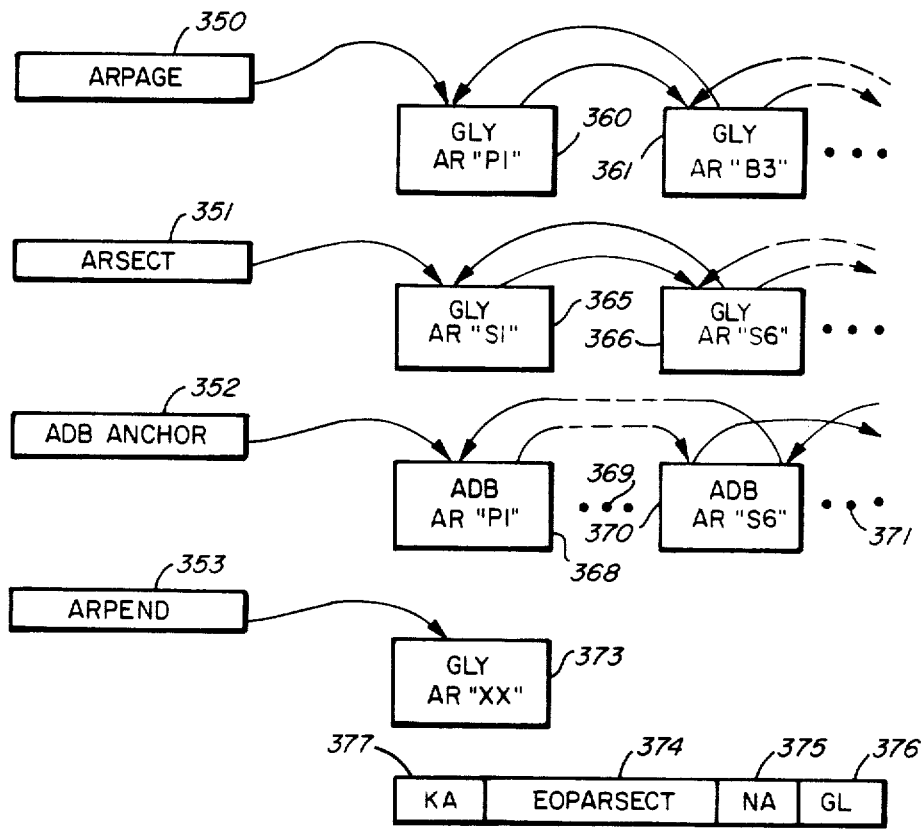
FIG. 13 illustrates data structures stored in addressable registers and used for machine management of named areas during document composition in the FIG. 1 illustrated document composer.

When all of the prior parameters 270 are OFF, formatter 22 then examines the last parameter PUT. If the PUT parameter 310 is zero, this means all of the parameters 270 were inactive or zero, resulting in no operation. Accordingly, formatter 22 follows path 282 to find the next control word (alternately, an error message can be supplied to the user). Otherwise, formatter 22 at 311 ends any section being formatted. Ending a section via the section header 80 (FIG. 5) follows the procedure of the aforementioned DCF Licensed Program. After the section is ended, formatter 22 at 312 checks to see if there are any pending section named areas (as described later with respect to FIG. 13, all named area galleys will be chained to an anchor). Formatter 22 checks the FIG. 13 illustrated anchor ARSECT 351 for any entry; if the anchor indicates zero, there are no pending section named areas to be placed on the logical page. With no pending section named areas, formatter 22 follows logic path 282 to examine the next embedded control word. Otherwise, a pending section named area exists and needs to be placed on the logical page; if the text and graphics in any of the pending section named areas don't fit on the current page, then such text and graphics are placed on the next succeeding pages. First, at 313, formatter 22 places as much of the pending section named area text and graphics on the current page as will fit. There may be a plurality of pending section named areas; as much text and graphics from each pending section named area are placed on the current page as will fit. There can be overlap of text and graphics from different ones of the pending section named areas within the page section being formatted.

When text and graphics are placed on a page from any named area, such placed text and graphics are removed from the named area by rechaining the GOBs (FIG. 5) from the chain of GOBs containing the text and graphics of such named area to a chain of GOBs already placed on the page and as later mentioned in more detail. Such rechaining uses known programming techniques. If the text and graphics from one or more of the pending section named areas overflow the current page, formatter 22 ends the current page (stops formatting to the page). This action is indicated by step 213B when EOP=1. EOP is handled as in the DCF page formatting licensed program, supra. Then formatter 22, at step 315, examines page and body named area pointer ARPAGE 350, later described with respect to FIG. 13. If ARPAGE 350 is non-zero, then at least one body or page named area is pending; then formatter 22 at 316 places text and graphics from those pending body and page named areas. Formatter 22 then handles the usual running header and running footer page formatting at 317 in the same manner as DCF handles such headers and footers. The pending section named areas are again examined at 312 for contained text and graphics not placed on any page. If any pending section named area continues to store text and graphics, the steps 312-317 are repeated. Finally, when all of the text and graphics of the section named areas have been placed, formatter 22 proceeds from step 312 (section area pending =0) to examine the next control word embedded in the unformatted text data stream.

Figure 10:
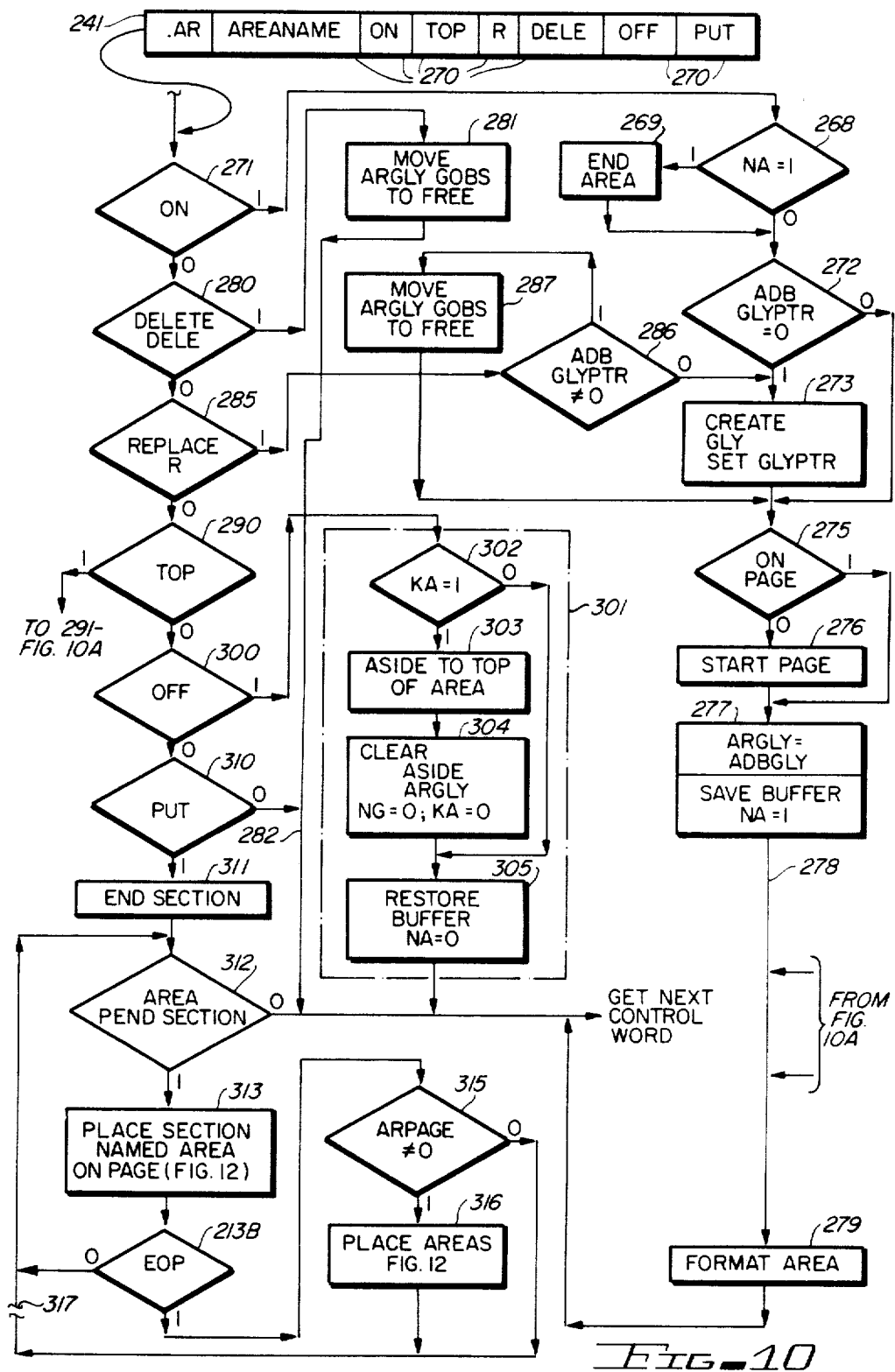
FIGS. 10 and 10A are a machine operation flowchart for the FIG. 1 illustrated document composer illustrating logical control of named areas for automatically managing the named areas with respect to the FIG. 4 illustrated logical page arrangement.
Figure 10A:
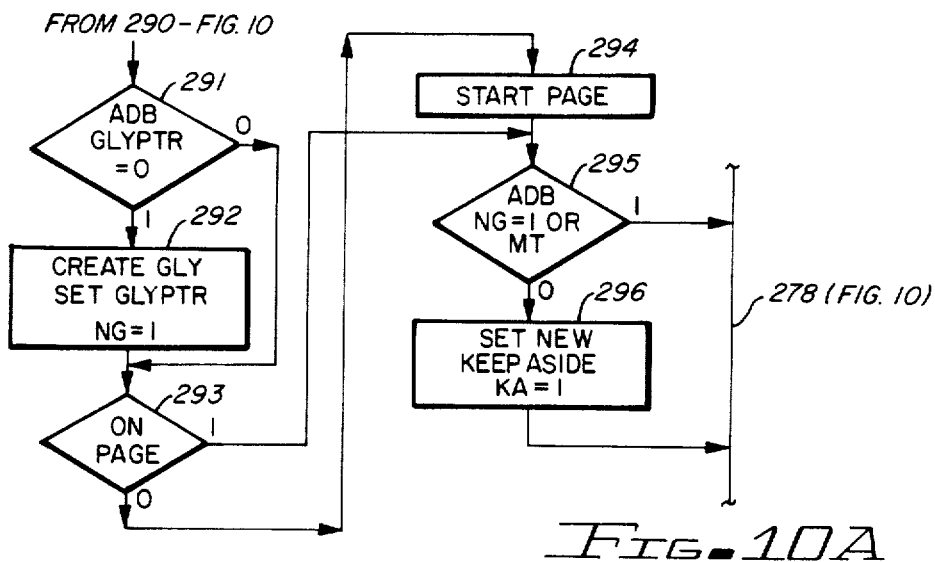
Figure 12:
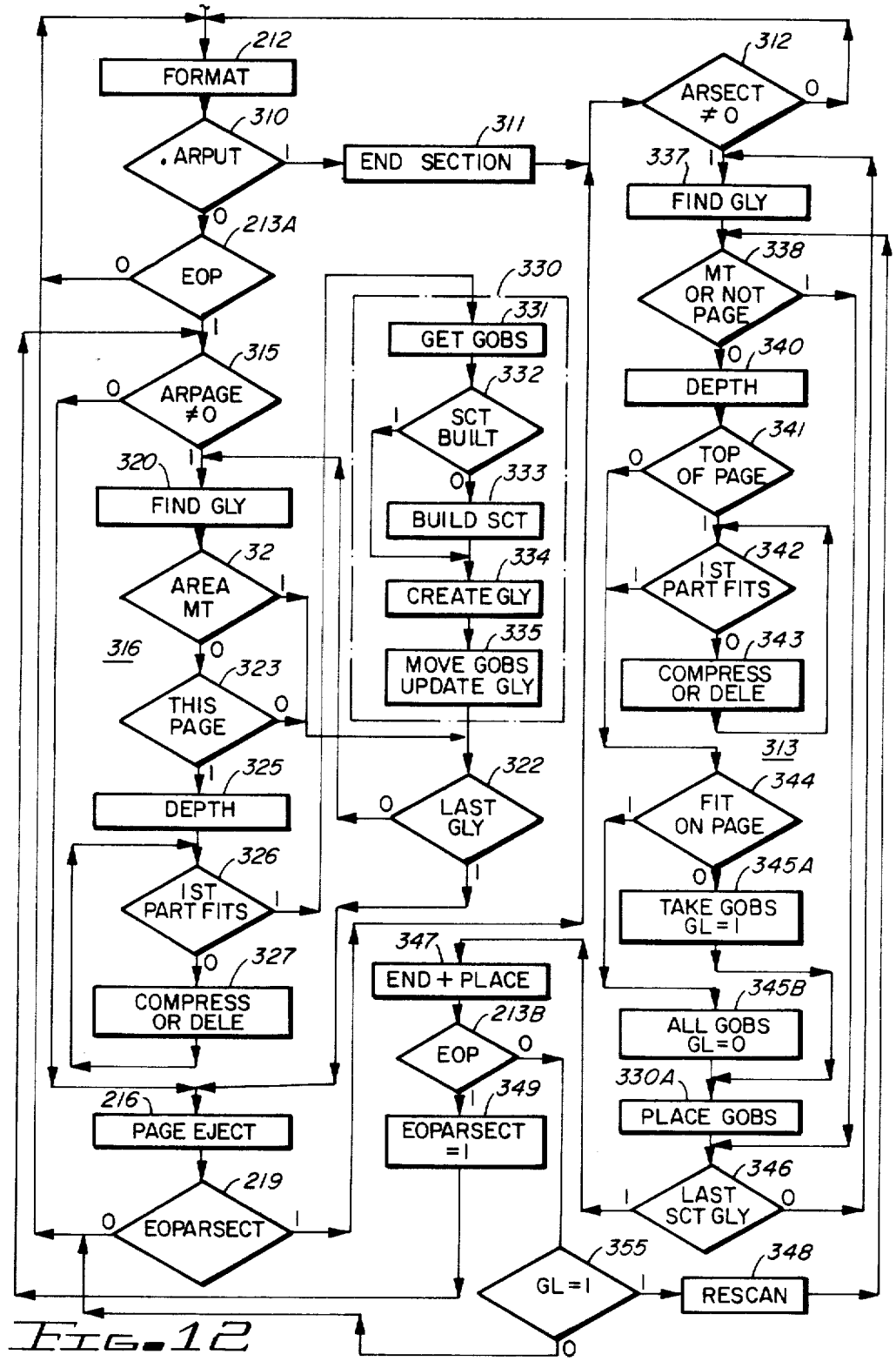
FIG. 12 is a machine operation flowchart of the FIG. 1 illustrated document composer which illustrates selective placement of the named areas at commanded times or at end of page time.

FIG. 12 illustrates the machine operations conducted by formatter 22 in placing text and graphics of a named area on a logical page 65. Such placement can be from an end of page as provided by the DCF Licensed Program, or from the machine operations of FIGS. 10 and 10A relating to the AREA control word .AR with the PUT parameter active. Formatter 22 at 310 (also see FIGS. 10 and 10A) examines any such received .AR PUT control word; if an .AR PUT control word is found, then the current body section is ended at 311 (also see FIGS. 10 and 10A). Pending section named areas are tested at 312; for any pending section named areas, the FIGS. 10 and 10A illustrated step 313 is then executed as detailed in FIG. 12 as steps 337–349. When an .AR PUT control word is currently in the unformatted text data stream, at step 213A (also see FIGS. 10 and 10A) formatter 22 checks for EOP using the DCF formatting procedures. As soon as EOP is established, formatter 22 checks at 315 (also see FIGS. 10 and 10A) for any pending page or body named areas. If there are no pending named areas, then the page is ejected at 216A and formatting continues in formatting steps 212 (also see FIG. 7). Any EOP having pending body or page named areas causes formatter 22 to place text and graphics from such named areas onto the current logical page (formatting has ended but the page is not yet ejected), as mentioned for step 316 of FIGS. 10 and 10A and detailed in FIG. 12 in steps 320–335.

First the placement of text and graphics from section named areas in response to an .AR PUT control word is described. In step 312, ARSECT 351 pointer (FIG. 13) is examined. If it is non-zero, then formatter 22 scans the later-described chain of section named area galleys pointed to by ARSECT. This scan starts with step 337 finding a galley 83 for a section named area. At 338 the found galley 83 is examined for determining the value of FGOB 131. If FGOB=0, the named area is empty (MT). Also, in step 338, a later-described page specifier is checked; if the current page is not specified, the section named area text and graphics will not be placed. In either event, formatter 22 proceeds to step 346 for continuing the scan of chained galleys 83. At 346, formatter 22 examines NGLY 126 of the just-examined galley 83. If NGLY=0, then that galley is the last galley in the chain, and formatter 22 terminates the scan and proceeds to later-described step 347. Otherwise, the scan continues by repeating steps 337, 338, 346 until a section named area galley indicates that some text or graphics have been formatted to the corresponding section named area (FGOB is non-zero).

Every time formatter 22 finds a section named area having text or graphics, it proceeds from step 338 to step 340 for measuring the depth of text and graphics in the section named area. The found galley 83 (FIG. 5) is accessed for reading MESD 136 which indicates text depth. At 341, formatter 22, using the DCF page indications, determines whether the formatting status is at the top of the page. In other words, the .AR PUT control word was embedded in the text stream such that all section named areas would be placed at the top of the page. In this instance, the maximal depth MAXD 137 in found galley 83 may be less than the text and graphics formatted to the section named area, which requires a plurality of page sections to be formatted on the page from the section named area. Continuing at 342, formatter 22 examines the text and graphics in the section named area to determine whether a first part of such text and graphics will fit into the page section being formatted from section named areas; that is, will a keep, paragraph, segment (image, graph, etc.) and the like fit vertically on the page within MAXD 137 indicated depth. This determination uses the programming of the referenced DCF Licensed Program. If such first part will not fit, then formatter 22 at 343 compresses the text or graphics by reducing skip, line space, etc., vertical depths. If the resultant compression of vertical depth enables the first part to fit, as again measured at 342, the first part is placed onto the page section. Otherwise, step 343 is repeated with an indication given (not shown) that the first part is not to be placed on the page section; an error message may be given to the operator. Step 343 includes a first-pass flag (not shown) for remembering that a vertical compression was attempted; formatter 22 senses this flag on the second pass to indicate a delete function. With the text and graphics deleted from the placement, no such text and graphics will fit on the page for allowing formatter 22 to proceed from step 342 to the next step 344.

When formatter 22 at 341 finds formatting status other than at the top of the page, or when the first part fits at 342, then formatter 22 determines whether or not sufficient vertical formattable space remains on the page being formatted to receive all of the text and graphics of the section named area. If a fit is not possible, only the GOBs 87 (FIG. 5), representing text and graphics that will fit, are placed on the page at step 345A. The GOB leftover flag GL 376 (FIG. 13) is set to unity for indicating that another page section is yet to be built from the section named area text and graphics. If all the text and graphics will fit (MESD 136 is less than the remaining vertical page space), then at 345B all GOBs 87 chained to the section named area galley 83 are moved to place the represented text and graphics on the page being formatted. The GOB leftover flag GL 376 (FIG. 13) is reset to zero for indicating that no text or graphics remain in the section named area being processed that are to be placed on a page at this time.

The GOBs placed on the page are removed from the chain of GOBs attached to the section named area galley, which removes the text and graphics from the section named area. The placement of the text onto the page is represented in the FIG. 12 drawing as step 330A. This action was achieved by building a section header 80 for the page, building and attaching a galley 83 for the section header, and then chaining all of the GOBs moved in either step 345A or 345B to the newly-built section-galley chained combination. Following processing of the text and graphics from the section named area being placed, formatter 22 then continues the scan for additional section named areas having text and graphics to be placed, as just described. The scanning for section named areas and placing text continues until formatter 22 has scanned the last section named area galley in the later-described FIG. 13 illustrated chain of such galleys. When the last section named area (LAST SCT GLY) has been scanned, formatter 22 proceeds from step 346 to step 347 for ending the page section 72 (FIG. 4) just formatted from the section named areas—such page section has a vertical depth equal to the greatest vertical depth of any of the section named areas indicated MAXD or the remaining vertical depth of the body, whichever is less. The remaining vertical depth is the vertical formattable space measured from the bottom of the immediately preceding section, as ended by steps 311 of FIG. 12 or 269 of FIGS. 10 and 10A, to the bottom of the body 70.

Whether or not placing the text and graphics from the section named areas ended the page is checked at 213B (EOP=1). If the end-of-page formatting has not been reached (EOP=0), then whether or not any text or graphics remain (GL=1?) in the section named areas being processed is checked at 355. If GL=1, then more text and graphics need to be placed; rescanning the section named areas is initiated at 348 by pointing to the first section named area galley being processed. Then steps 338 through 355, just described, are repeated until all of the text and graphics have been processed, which may include starting new pages, to be formatted as will be described. When GL=0, then all of the text and graphics have been placed, allowing formatter 22 to return to step 212 for continuing formatting by analyzing the next embedded control word.

If at 213B EOP=1, formatter 22 at 349 sets the flag EOPARSECT 374 (FIG. 13) to unity for indicating that the page formatting is ending during processing text and graphics from section named areas. Then formatter 22 proceeds to step 315 for processing the page and body named area text and graphics as next described.

The processing of page and body named-area-contained text and graphics follows ending page formatting either at step 213A from formatting in step 212, or at step 213B while placing section named-area-contained text and graphics. If there are no page or body named areas indicated in the ARPAGE pointer register 350 (FIG. 13), the page is ejected at 216. Then at 219 the flag EOPARSECT 374 is examined to determine if the page eject is in the middle of processing section named areas (EOPARSECT=1). If such is the case, then formatter 22 goes to step 312 to continue processing of section named area text and graphics. When EOPARSECT=0, then the page eject resulted from formatting to a page in step 212, whereupon formatter 22 resumes such formatting.

When at least one body or page named area has text and graphics, formatter 22 proceeds from step 315 to scan the FIG. 13 illustrated chain of page and body named area galleys attached to pointer ARSECT. The first step 320 finds the first galley 83 in the chain; it can be either a page or body named area galley. At 321 FGOB 131 is examined to see if the area is empty (MT)—MESD 136 can be examined as well to ensure that other than just empty GOBs are chained to the galley. In any event, if the galley indicates an empty named area, at 322 formatter 22 determines if the galley just analyzed is the last one, i.e., is NGLY 126 of galley 83 equal to zero or does it point to another named area galley to be next analyzed. If the scan is complete, the page is ejected at step 216.

Assuming that the body or page named area is not empty at 321, formatter 22 at 323 determines whether the named area is page specific, as later described. If not page specific or the page is the specified page, formatter 22 places text from the page or body named area to the current just-ended but not ejected logical page. Otherwise, the scan of body and page named area galleys continues as described.

To place text and graphics from the body or page named area, formatter 22 at 325 obtains the depth of such text and graphics by reading MESD 136 of the appropriate galley. Steps 326 and 327 correspond in function to the previously described steps 342 and 343, respectively, for placing a first part of the text and graphics onto the page. When a fit or delete has been determined, formatter 22 proceeds from step 326 to step 330, which includes steps 331 through 335 for placing the text and graphics onto the page and deleting the placed text and graphics from the page or body named area.

At 331, formatter 22 gets the GOBs from the appropriate page or body named area galley 83 by dechaining same and changing them to a pending galley 83, not separately shown. At 332 whether or not a section header 80 exists for placing the text and graphics onto the page is checked. If one doesn't exist, a section header is built at 333 using the DCF programming. After a section header 80 exists, formatter 22 at 334 creates a galley 83 for receiving the chain of GOBs and attaches the just-created galley 83 to the section header 80 referred to above. At 335 the GOBs are moved, by rechaining, from the temporary galley to the just-created page galley, which completes placing the text onto the page. The galley fields are updated to reflect the depth change by changing MESD 136 and indicating rotation at 135, etc. The section header 80 discussed above is chained to a page identifier as indicated by arrow 99 in FIG. 5 and as already practiced in the DCF Licensed Program.

From steps 330, formatter 22 goes to the previously described step 322 for determining whether or not additional page or body named area galleys need examination before page eject. Accordingly, it is seen that section named areas can be placed onto the page being formatted beginning anywhere in the body portion 70 (FIG. 4) and that, if any one or more of such section named areas contain sufficient text and graphics, a plurality of pages may be started and ended while placing such text and graphics. Each time a page is ended and before page ejection due to such section named area text placement, the page or body named area text and graphics are placed on the pages in an interleaved manner with the section named area text and graphics. Further, any running header or running footer text and graphics are also interleaved by the first-level formatter (DCF) with the section, page, and body named area text and graphics. This flexibility in formatting creates a facility heretofore unknown in automatic formatting and composing.

FIG. 13 shows the data structures which are stored in registers of data processor 13 which are used by formatter 22 in managing and processing text and graphics with respect to named areas. Processor 13 registers 350, 351, 352 and 353, which can be a portion of a main data storage section (not shown) in data processor 13, contain address signals pointing to the various galleys and other control blocks stored in such data storage units. The registers 350-353 are in dedicated areas of the data storage unit for facilitating, scanning and accessing the data structures stored in the various registers as shown in FIG. 5. Register 350 contains the address pointer ARPAGE, which is the address pointer pointing to the first galley 360 in a doubly-linked chain of galleys, all of which define named areas which may or may not contain formatted text and graphics. For example, galley 360 contains information concerning page type named area "P1", while galley 361 contains information concerning the body type named area "B3". Such named areas are intermixed on the single doubly-linked chain since both types of named areas are placed on logical page at page eject time. Accordingly, each time there's a page end, formatter 22 accesses the contents of register 350 and the galleys 360, 361, et seq., using normal programming scan techniques for implementing step 320 of FIG. 12. In the event that the .AR control word with the PUT parameter active is used to initiate the named areas scan, formatter 22 then accesses register ARSECT 351 which contains the address of the first galley for section named areas. For example, a first galley 365 is pointed to by the signals stored in ARSECT 351 and identifies named area "S1". In a similar manner, galley 366 identifies area "S6", while other galleys within the doubly-linked chain of galleys identify other section-type named areas. In this manner, the formatter 22 scan is limited at each .AR control word PUT time to those galleys chained to register ARSECT 351, while at page-end time the scan is limited to those galleys chained to ARPAGE 350. For purposes of brevity, not shown in FIG. 13 are any of the GOBs 87 that are appended to the respective galleys which contain formatted text and graphics data. The galleys are chained to the registers 350, 351 whenever a galley is created, as described.

The area definition blocks (ADBs) shown in FIG. 11 are chained to register 352 (FIG. 13) which contains the ADB ANCHOR, an address pointer pointing to the first ADB 368 in a doubly-linked chain of ADBs. Remember, an ADB is generated each time a DEFINE AREA control word is executed by formatter 22. The existence of an ADB within the doubly-linked chain attached to register 352 does not mean that a named area galley has been created. Each ADB is associated with a given named area irrespective of its type. For example, ADB 368 is for area "P1" which has galley 360 chained to register 350. Intermediate ADBs are indicated by ellipsis 369. ADB 370 identifies named area "S6", which is a section named area chained to register 351. Ellipsis 371 indicates yet other ADBs are in the doubly-linked chain. Accordingly, when an AREA control word is received and executed as explained with respect to FIGS. 10 and 10A, ADB ANCHOR 352 is accessed and the ADBs' doubly-linked chain is scanned for identifying any previously-defined named area.

Register 353 contains an address pointer ARPEND which points to a single galley 373, which identifies the current named area which is pending; that is, the named area which currently is receiving formatted text by the operations of formatter 22 in response to a received AREA control word. Since only one named area is formatted at a time, only one galley will ever be chained to ARPEND 353. Single bit registers 374–377 store previously described flag signals.

Figure 14:
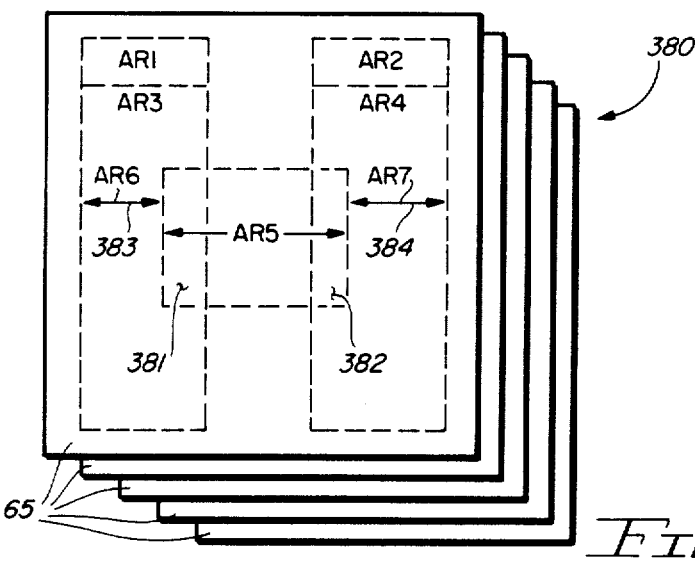
FIG. 14 illustrates the spatial relations of named areas to a plurality of pages of a document being prepared.

FIG. 14 illustrates logical relationships of named areas to a plurality of logical pages 65 constituting a document 380 to be prepared. The named areas identified as AR1 through AR7, inclusive, are shown in their assigned positions as page named areas. Each of the logical pages 65 is capable of receiving formatted text and graphics from any of the named areas AR1 through AR7 whenever an embedded AREA control word occurs during the formatting of that given logical page. All of the areas are formatted independently and, as explained with respect to FIG. 15, the formatting of the text to the named areas is independent of their indicated depth in register 329 of FIG. 11. Areas AR1 and AR2 are located at the top of the logical pages 65, are relatively small, and can be designed for containing list indices or other header information independent of the running header controls. AR3 and AR4 are named areas for placing columns of text and graphics onto the logical pages 65. Areas AR3 and AR4 overlay with centrally-positioned named area AR5 in subareas 381 and 382. Accordingly, when formatting a logical page 65 and when an area AR5 is to be included on a given page, the user, instead of activating areas AR3 and AR4, can activate areas AR6 and AR7 which respectively overlay areas AR3 and AR4, except that such named areas are coextensive with the vertical periphery of area AR5 as indicated by double-headed arrows 383 and 384, respectively. Accordingly, areas AR6 and AR7 have a notch out of the areas corresponding to the subareas 381 and 382. In this manner, area AR5, which may contain a bar chart, graph or photograph, for example, can be selectively inserted on any logical page as a condition precedent to selecting AR3, AR6 or AR4, AR7. The formatting of AR5 and placement of AR5 on a given logical page can be used as a branch or condition precedent to the selection of the other areas. This selection can be achieved through GML tags by creating macros, as explained in the referenced publications. Accordingly, any named area can occur on each page of a document being composed, can selectively occur on any pages for accommodating various formatting desires or characteristics, and can be made dependent upon the location of other named areas or other formatting parameters with respect to any given logical page.

Figure 15:
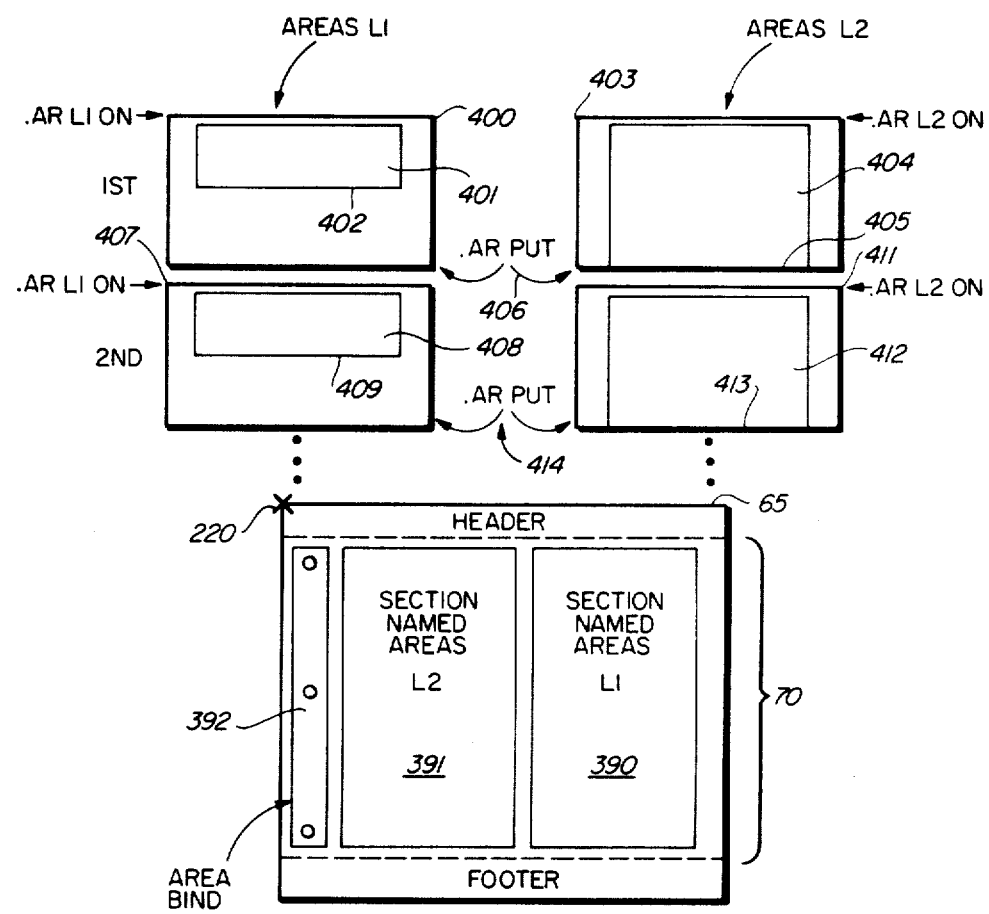
FIG. 15 illustrates applications of the independent named area formatting superposed over the FIG. 4 illustrated logical page by the FIG. 1 illustrated document composer for providing a variety of automatic formatting functions.

FIG. 15 and the following description indicate use of GML tags for formatting named areas for creating side-by-side columns of text and graphics which are vertically aligned using predetermined rules. For example, in creating a bilingual document, the number of words to express a thought in a first language may be fewer than the number of words required to express the same thought in the second language. Generally, the first line of the paragraph expressing a given thought in a paragraph will be aligned in side-by-side columns. Two GML tags are created for achieving this formatting function using named areas. The first GML tag ":L1." contains five control words in its macro 205. The five control words are:

.AR OFF

.AR PUT

.DL L1

.AR L1 ON

.BF XX

The control word .BF is optional when a font change is desired and .DL is optional for hyphenation.

A second GML tag ":L2." having three control words in its macro is constructed as follows:
.AR OFF

.DL L2

.AR L2 ON

The GML tag :L1. is used to format a named area hereinafter referred to as L1, while GML tag :L2. is used for formatting a named area hereinafter referred to as L2. The formatting of the text to the two named areas occurs after the creation of an appropriate galley for each of the named areas. The unformatted text stream supplied to formatter 22 interleaves the two GML tags with text to be formatted alternately to areas L1 and L2. Such text data stream may appear as follows: ":L1. (text to be formatted) :L2. (text to be formatted) . . . EOF". Formatter 22 responds to the GML tags and associated macros and the unformatted text stream to alternately format text to named areas L1 and L2.

The operation of the macro corresponding to GML tag :L1. begins with .AR control word, previously described, turning any named area OFF during alternation. This amounts to terminating the named area associated with GML tag :L2. This control word is followed by an .AR control word with the PUT parameter which places text into L2. When the named areas L1 and L2 are selected to be SECTION areas, a requirement for this particular illustrated operation, the control word .AR PUT synchronizes the visual presentation of the two areas L1 and L2, since the placement of the area L2 is synchronized to the area L1 by the PUT parameter of the AREA control word. That is, L2 will always be placed beginning at the top of the section, which section being determined by the longer portion of the text formatted to either of the named areas. Stating this another way, the depth of the section containing both named areas which are placed on the page by the single .AR control word having the PUT parameter active with no named area identified determines the depth or length of the section. Termination of the section enables the DCF Licensed Program to generate a new section which is formatted and has its length determined in the manner above stated. When a section has a length greater than the remaining depth of the logical page, it is moved to the next logical page in accordance with the DCF Licensed Program procedures for page determination.

Referring now more particularly to FIG. 15, page 65 has region 390 for receiving a plurality of section type of named areas L1, and a second region 391 for receiving section named areas L2. The areas L1 and L2 all reside within the body portion 70 of the logical page. Additionally, a page area 392 for facilitating binding is located on logical page 65 with respect to reference point 220. The section named areas to reside in 390 and 391 are positioned respectively to vertical sections which extend the width of the body 70 as shown in FIG. 4.

The formatting and placement of two named areas L1 and two named areas L2 using the GML tags :L1. and :L2. ensues. The description assumes that the areas L1 and L2 are defined and have a depth greater than the depth required for receiving text in a first and second language respectively. Firstly, the GML tag :L1. institutes a sequence of five control words. Any previous area is turned OFF. The .AR PUT control word scans for section named areas (reference FIGS. 10 and 10A); assuming that those section named areas have formatted text, no formatting action occurs. The control word .DL L1 selects the first language for formatting in the area L1. This is followed by the .AR control word turning formatting of named area L1 ON, as at 400 in FIG. 15. The BEGIN FONT control word (.BF) selects the fonts to be used for both the named areas L1 and L2, no limitation thereto intended. The ensuing text is then formatted as indicated by numeral 401. Then the GML tag :L2. is encountered in the unformatted text data stream. The first control word turns the area OFF, indicated by numeral 402 in FIG. 15. A second language control word .DL L2 is selected for formatting to the area L2. The .AR control word turning L2 ON corresponds to numeral 403 in FIG. 15. The ensuing text is then formatted as indicated by numeral 404. Then at 405 a second occurrence of the GML tag :L1. is encountered, resulting in the .AR control word OFF stopping the formatting. At this point in time, in named areas L1 and L2, indicated in FIG. 15 at the first alternation, the depth of the section to be used for placing the text formatted to the two named areas L1 and L2 in the regions 390 and 391 of logical page 65 has not yet been determined. The next-encountered control word .AR PUT causes formatter 22, as explained with respect to FIGS. 10 and 10A, to scan for all section named areas having text formatted thereto, and then terminates the section at a depth equal to the greatest depth of text formatted to any one of a plurality of section named areas. In FIG. 15, this action is represented by numeral 406 showing the two named areas terminating at the bottom of the text area 404, as indicated by numeral 405. At this time, the text from named areas L1 and L2 is placed respectively in the regions 390 and 391 of logical page 65. It should be noted that the text for area L1 is received in the text data stream before the text of area L2 is received while on page 65; a reader would read the text received for area L2 before reading the text for area L1. In other words, the sequentiality of columns in previous formatters is obviated through the use of section named areas. Such sequentiality is also removed through the use of page and body named areas by selectively locating the named areas on the page independent of the sequence in which the unformatted text data and graphics are received.

Following the control word .AR PUT, the area L1 is again formatted using ensuing text. Beginning at 407, the text being formatted at 408 encountering a subsequent GML tag :L2. results in an .AR OFF control word terminating the formatting of data to area L1 at 409. The depth of the section named area L1 has not been determined at this point insofar as placement on page 65 is concerned. Area L2 then begins formatting at 411, and is generally indicated at 412 as encountering a subsequent GML tag :L1., which turns the area L2 OFF at 413. Immediately following, the .AR PUT control word at 414 selects the section length to be equal to the greatest depth of text or graphics formatted to any section area being placed on logical page 65. The above-described cycles are repeated until all of the text in the received unformatted text data stream has been placed in accordance with the interleaved GML tags. It should be appreciated that a larger plurality of columns can be so formatted, with the sequence of formatting being independent of the sequence of receipt of text and graphics data. Accordingly, the section named areas provide a vehicle for formatting logical pages and documents in a manner independent of the sequentiality or order of receipt of text and graphics to be formatted, a function heretofore not provided through automatic means. As described later in this description, yet greater flexibility in text and graphics placement in a multipage document is facilitated through the use of PAGE, BODY, and SECTION named areas.

Figure 16:
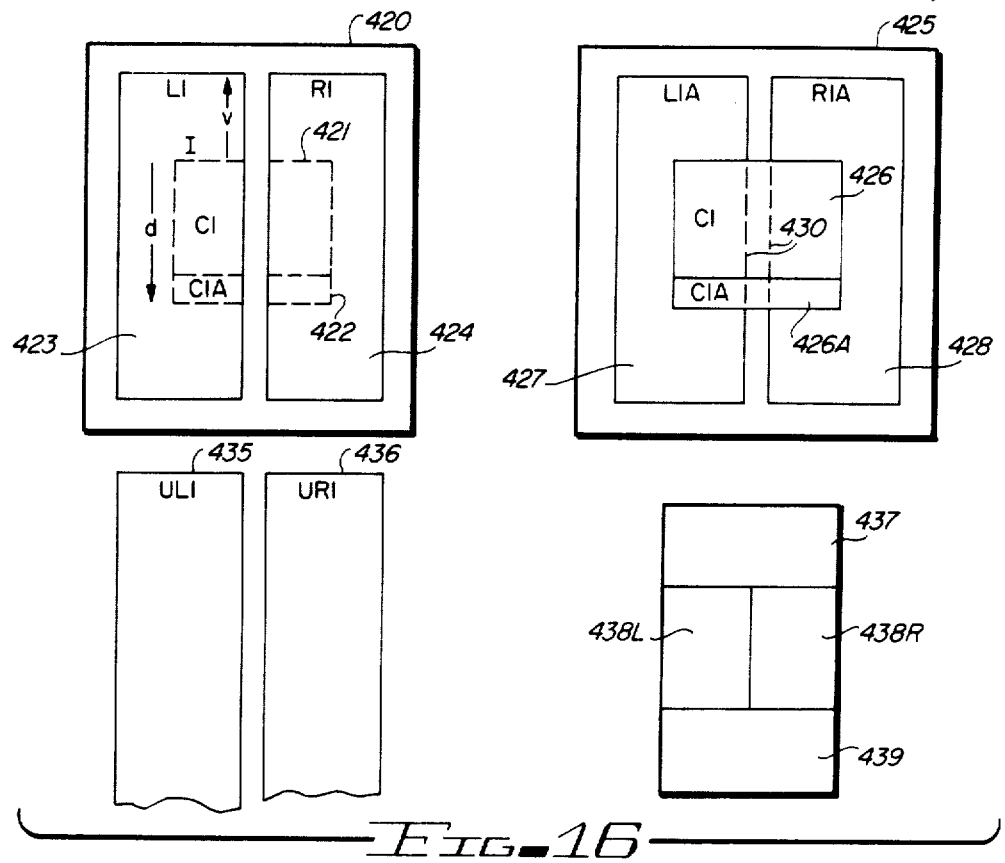
FIG. 16 diagrammatically shows a few applications of the named area independent formatter in a multicolumn environment.

FIG. 16 shows applying named area formatting to achieve selected insertion of a central text or graphics area C1 on a logical page. The FIG. 16 illustration assumes that the central area C1 has been formatted and is known to be placed upon a given page before the other named areas designated at L1, R1, or left column and right column, respectively, are formatted. Areas numbered 423 and 424 respectively for L1 and R1 are shown as rectangle when an area C1, enumerated by 421, also is to be placed on the same page such that the area C1 overlays a portion of L1 and R1. The first technique is to provide format interaction between areas C1, L1 and R1 such that the right-hand margin of L1 is indented to accommodate the formatted area C1, while the area R1 is left-hand-margin indented to accommodate area C1, generally as indicated by the dashed lines in FIG. 16. In this manner, the area C1 can have a variable depth as indicated by subarea C1A, enumerated by 422. Because of the logical placement of area C1, its vertical displacement "v" is known, as is the depth "d". The width of C1 determines the indent "I" for L1 and R1 as will become apparent. The table below shows the sequence of control words, most of which are from the DCF Licensed Program, supra, for implementing the formatting of page 420 with areas L1, R1 with selective embedding of the central area C1.

TABLE A

| | FIG. 16 |
|---|---|
| (1) | .AR C1 ON |
| (2) | (FORMAT C1) |
| (3) | .AR L1 ON |
| (4) | .IR I FOR & AD'C1 AFTER V |
| (5) | (FORMAT TEXT TO L1) |
| (6) | .AR L2 ON |
| (7) | .IN I FOR &S AD'C1 AFTER V |
| (8) | (FORMAT TEXT TO L2) |
| (9) | .AR OFF |
| (10) | .AR PUT |

In the table above, the text and graphics in L1 and L2 are placed as section named areas in step (10) by the .AR PUT control word. The text depths of L1 and L2 exceed page maximal depth; accordingly, as much of the text and graphics in L1 and L2 as will fit on the first page will be placed on that page. This action results in an EOP condition, resulting in the page named area C1 to be placed on that page—an example of nonsequential formatting enabled by the use of named areas. When C1 is placed on the current page, that page is ejected and a new page is started as by DCF. Then the leftover text and graphics in L1 and L2 are placed on as many succeeding pages as may be required.

A second technique shown in FIG. 16 is to have two superposed areas L1 and L1A and R1 and R1A. The areas L1A and R1A shown on page 425 have an insert formed in the areas for accommodating areas C1 and C1A, respectively enumerated by 426 and 426A. Area L1A corresponds to numeral 427, while R1A corresponds to numeral 428. When C1 has no text or graphics, then the areas L1 and R1 are formatted in the usual manner, such as indicated by the vertical dashed line 430. The table below shows the sequence of control words for enabling formatter 22 to achieve the above-described action, which also requires a page-limited named area (PAGE mode) as will be fully elaborated upon later.

TABLE B

| FIG. 16 |
|---|

| | |
|---|---|
| (1) | (FORMAT C1) |
| (2) | .IF&$AD'C1 GT 0 |
| (3) | .TH .AR L1A ON PAGE |
| (4) | .EL .AR L1 ON PAGE |
| (5) | .IA UL1 |
| (6) | .AR OFF |
| (7) | .IF &$AD'C1.GT 0 |
| (8) | .TH .AR R1A ON PAGE |
| (9) | .EL .AR R1 ON PAGE |
| (10) | .IA UR1 |
| (11) | .AR OFF |
| (12) | .AR PUT |

In the table above, the area C1 must be formatted first. Then at step (2), the .IF statement examines the formatting of area C1. If the area is greater than zero, as indicated by MESD 136 (FIG. 5), then at (3) the area L1A is turned ON in the later-described PAGE mode. Otherwise, at (4) the area L1 is turned ON, also in the PAGE mode. The PAGE mode prevents reformatting named areas when the content of the named area will vary from page to page in the document. At (5), control word .IA is to insert an area UL1 into L1A or L1. Area UL1, designated by numeral 435, merely receives the text and graphics to be formatted to the named areas L1 and R1 when in the PAGE mode, but stores them in unformatted text data in an area of the main data storage of the processor 13, i.e., only at data storage areas. When the areas L1A or L1 have received sufficient text and graphics, formatter 22 at (6) responds to the .AR OFF control word. Then at (7), at another .IF statement, formatter 22 determines whether area R1A or R1 is to be used in the PAGE mode, as determined in steps (8) and (9). Another embed area command at (10) transfers data from area UR1, numeral 436, to area R1A or R1 as selected in steps (8) or (9). At (11), the .AR control word turns the area R1A or R1 OFF. Then at (12), the named area formatted text and graphics are placed on the logical page 425 by the control word .AR PUT.

A third technique shown in FIG. 16 is to divide each of the areas L1 and R1 into four named areas, enumerated 437–439. Named area 437 corresponds to the upper portion of the area L1, for example. Named area 438L corresponds to the portion of L1 when indented for accommodating area C1, while the combination of areas 438L and 438R corresponds to the area L1 when C1 contains no text and graphics. Named area 439 corresponds to the bottom portion of area L1. The areas 437–439 are selectively connected such that three or four of the named areas can be formatted actually in a preferred form. The areas 438L and 438R are combined into one named area when the central area C1 has no text or graphics. Accordingly, a .IF DCF control word will select one or the other of the two named areas for receiving text and graphics, as will become apparent.

Figure 17:
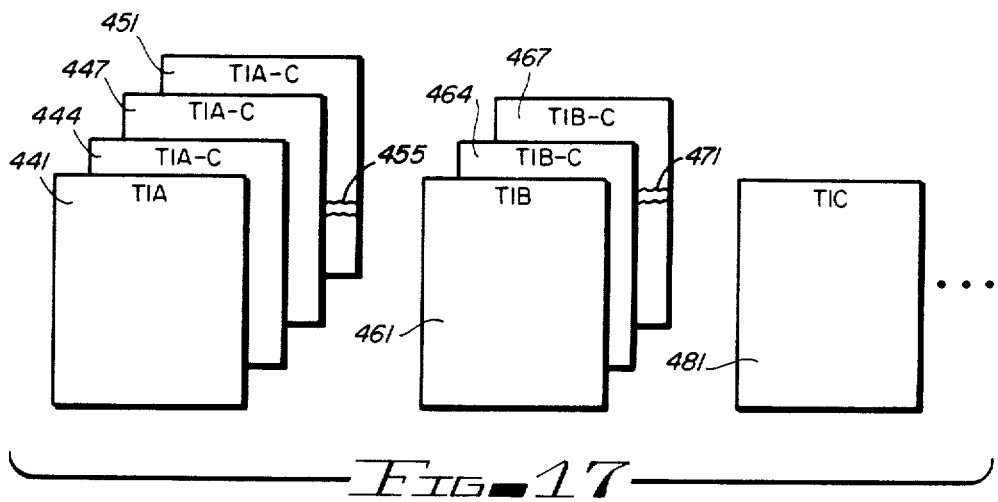
FIG. 17 diagrammatically illustrates other uses of named areas.

FIG. 17 shows the application of a running header to named areas. A single named area has its text distributed over four pages, 441, 444, 447 and 451. A running header is embedded in the named area such that the title TIA appears on all four pages. On pages 444, 447 and 451 the word "continued", abbreviated in the drawing by the letter "C", is added to the title. Numeral 455 designates the ending of the text for the named area on page 451. Subsequent text "B", also having a running title TIB, is formatted to pages 461, 464 and 467 in the same manner as described for text A. Text B stops at point 471 on page 467. In a similar manner text C is added to page 481. In this case, the amount of text can be contained on a single page, therefore the page eject mechanism, automatically instituted through the programming of the DCF Licensed Program, supra, does not separately fragment the text in a single named area among a plurality of logical pages.

The sequence of control words set forth below, together with the comments, shows the DCF Licensed Program control words plus the control words of the present application for formatting a running header within a named area on a plurality of pages and changing the named areas in accordance with GML tags between sets of text and graphics; for example, "A" can be a first chapter, "B" a second chapter and "C" a third chapter.

TABLE A

| FIG. 17 |
|---|
| DEFINE A NAMED AREA |
| .da fred 0 0 section |
| DEFINE A RUNNING HEADER |
| .rh on |
| .if &AD'fred eq 0 .go around |
| .ar fred top |
| .ce &title (con't.) |
| .sp 1 |
| .ar fred off |
| ...around |
| .ce patent example |
| .sp 1 |
| .rh off |
| DEFINE A GML TAG |
| .aa title title |
| .dm title on |
| .ar off |
| .ar put |
| .gs scan title |
| .cp |
| .ce &title |
| .sp 1 |
| .ar fred on |

TABLE A-continued

FIG. 17

```
.dm off
```

Figure 18:
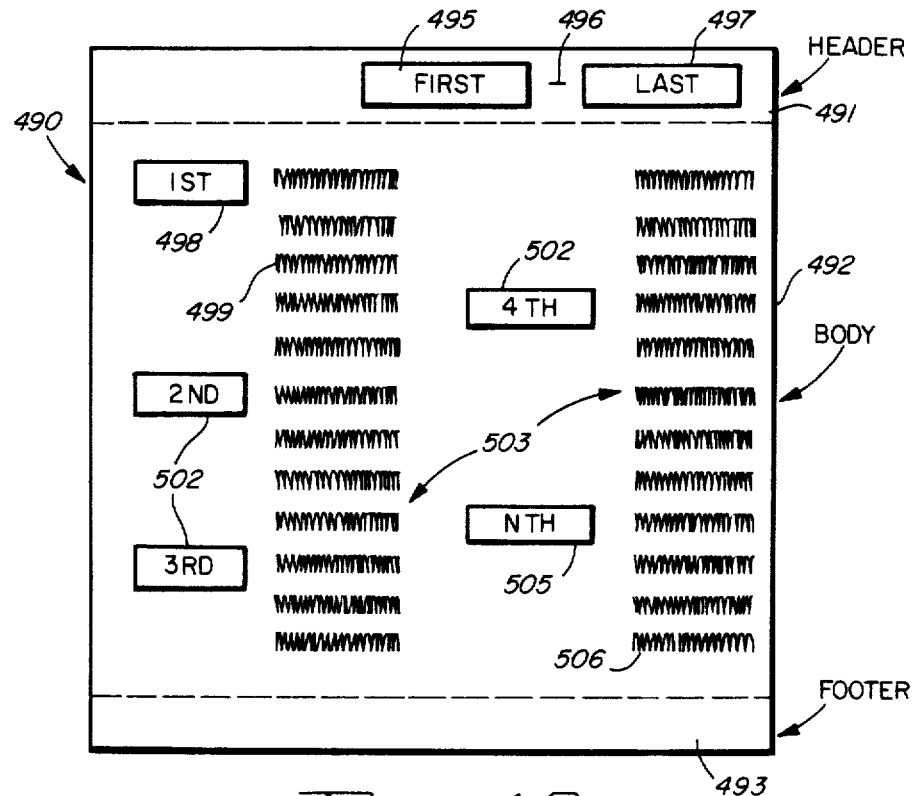
FIG. 18 shows an application of named areas in a running title application in a multicolumn environment.

FIG. 18 shows a logical page 490 formatted in dictionary format with a running header 491, a body 492 and a running footer 493, such as for page numbering. The running header 491 includes a first named area 495 and a last named area 497. The named area "first" will contain the "first" title as from title 498. The body 492–496 is an integral part of the running header and is formatted outside of the named areas 495 and 497. The contents of "last" named area 497 are made equal to the NTH title 505. Initially, as the page 490 is being formatted, the contents of title named areas 495 and 497 are equal to the contents of 498. Then text 499 is formatted following titles 502 which are the second, third and fourth titles corresponding to text 503; the formatter 22 updates the contents of named area 497 until the last title is located within area 497. When the logical page 490 is then formatted, the named areas 495 and 497, being page named areas, are placed on the page at page eject time as described with respect to FIG. 12 and with the appropriate informational contents for identifying the contents of the logical page.

The sequencing in DCF and the new control words for implementing the procedure for making the contents of named areas 495 and 497 in accordance with the titles 498 and 505 use the GML tag and the macro set of control words set forth in the table below:

TABLE A

FIG. 18

```
.IF & FIRST ≠ YES .GO AROUND
.AR FIRST REPLACE
.RI & TERM
.AR OFF
.SE & FIRST = NO
...AROUND
  .
  .
  .
.AR LAST REPLACE
.LI & TERM
.AR OFF
  .
  .
.RH ON
.CE "."
.SE & FIRST = YES
.RH OFF
  .
  .
```

Examination of the above control words in view of the DCF Licensed Program will show the sequence of operations provided by formatter 22.

Figure 19:
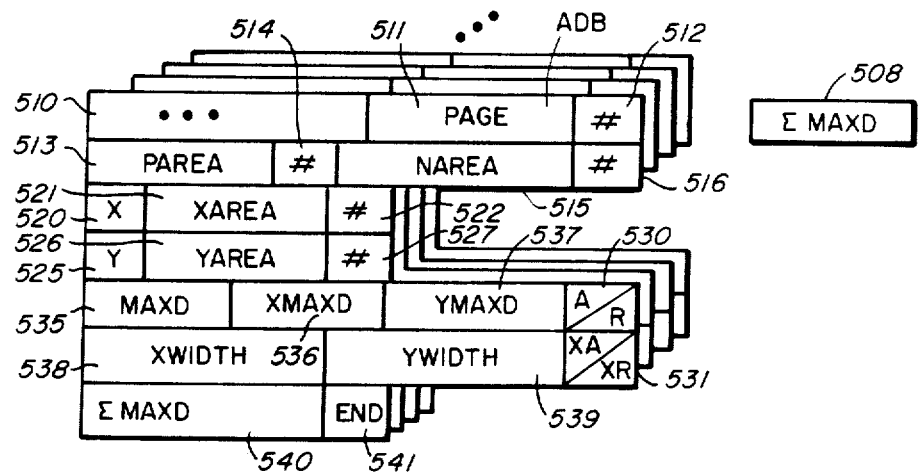
FIGS. 19 and 19A show a plurality of registers for storing control information relating to selecting named areas on a page specific basis. These registers relate to the registers shown in FIG. 11 and the control word registers shown in FIG. 9.
Figures 19A, 20, 21:
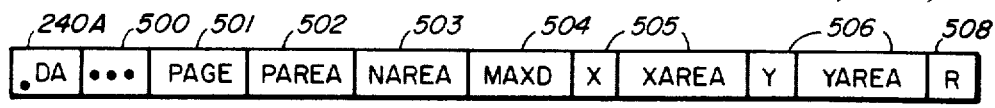
FIGS. 20 and 21 are machine operation charts illustrating modifications of machine operations shown in FIGS. 10 and 12, respectively, for providing certain page specific functions for named areas.

FIGS. 19 through 21 illustrate page limiting (PAGE mode) named areas. In FIG. 19 a DEFINE AREA control word 240A includes all of the parameters of the DEFINE AREA control word 240 shown in FIG. 9. Control word 240 is indicated in FIG. 19 by numeral 500. In addition, page bit 501 indicates whether or not the formatting to the defined named area is to be limited to what can be placed on a single logical page 65; i.e., when the page bit 501 is active, then the virtually bottomless formatting of the named areas is inhibited. Pointers 502, 503 define the connections to other named areas. PAREA 502 identifies the previous connected area, while NAREA 503 identifies the next area. In a sequence of formatting, PAREA receives text before the currently-defined named area, i.e., the named area being defined by the current control word 240A, while NAREA 503 names the named area to receive text when the current named area has been filled. MAXD 504 indicates the maximum depth for the currently-defined named area. This parameter will be placed in the named area galley in field 137, as shown in FIG. 5, as well as in the later-described modified area definition block. X and Y bits 505 and 506 relate to branching on an .IF control word for selecting, for example, area L1 or L1A, depending upon whether or not a named area C1 had been previously formatted as explained with respect to FIG. 16. As an example, X bit 505 corresponds to selecting area L1, while Y bit 506 corresponds to selecting area L1A.

Register 508 contains the summation of all the maximum depths of connected named areas processed to a particular point in formatting, as explained later with respect to FIG. 20. The number contained in register 508, an addressable register in the main memory of processor 13, is used to compare with the depth of the text and graphics being formatted to a plurality of connected named areas for determining whether or not such text and graphics will fit in the connected areas.

The area definition block shown in FIG. 19 includes all of the registers of the area definition block shown in FIG. 11 as indicated by numeral 510. PAGE bit 511 is set to the active condition whenever the FIG. 19 illustrated ADB is constructed based upon a control word 240A. In the event the PAGE area 501 of the DEFINE AREA control word 240A is page specific, i.e., a logical page number, then register 512 receives the page number. This page number indicates on which logical page, and only which logical page, the named area defined by control word 240A is to be placed within the document. As later explained, such page number can be relative to another page or can be absolute. Register PAREA 513 receives the contents of parameter PAREA 502; when PAREA 502 includes a specific page number, register 514 receives the page number indicating on which logical page 65 the previous connected area is placed. In a similar manner, NAREA register 515 receives the contents of NAREA 503, together with any specified page number which is stored in register 516. The X bit 505 is loaded into bit register 520, while the corresponding XAREA is loaded into register 521. Any page specified within the parameter 505 is loaded into register 522 for indicating on which logical page the XAREA is to be placed. In a similar manner, the Y bit of parameter 506 is loaded into the bit register 525, while the YAREA parameter is loaded into register 526. When the YAREA parameter 506 includes a page-specific number, that number is loaded into register 527. Parameter MAXD 504 is loaded into register 535. Registers 536, 537 can be loaded with the maximum depth for the X and Y areas by accessing the respective area definition blocks corresponding to the area names XAREA and YAREA. Register 530 indicates whether the page numbers in registers 512, 516, 522 or 527 are absolute or relative, as indicated by the R parameter 507 of control word 240A. Registers 538, 539 contain X and Y widths of the respective X and Y designated areas, while register 531 contains whether or not the page numbers for the X and Y areas are absolute or relative as determined by their respective area definition blocks. Such area definition blocks are set by another control word 240A having an area name corresponding to the X and Y areas. Register 540 contains the summation of the maximum depths of all connected areas that are chained to the ADB through pointers 513 and 515. END bit 541 indicates that the ADB identifies the last connected named area of a chain of connected named areas. In this regard, NAREA 515, when all zeros, can also indicate the end of a chain of connected named areas; however, named areas can be connected in a circular fashion such that, by using the relative page addressing, for example, ten pages can be a cycle of document preparation using a series of connected named areas. Then END bit 541 indicates termination of such named area cycling.

FIG. 20 illustrates the machine operations executed by formatter 22 as initiated from the machine operations illustrated in FIGS. 10 and 10A via logic path 278. First at 550, the ADB corresponding to AREANAME of the named area being processed (as shown in FIGS. 11 and 19) is accessed and stored in a buffer (not shown) within formatter 22 for managing the formatting of text and graphics to the named area using the page designations. At 551 the PAGE bit 511 (FIG. 19) is examined. If the PAGE bit is 0, then at 552 the ensuing text and graphics are formatted to the named area using no MAXD following the formatting. The next control word is obtained at 553 for continuing processing of the document. When the PAGE bit is active, formatter 22 proceeds from step 551 to make the contents of register 508 equal to MAXD obtained from the named area galley 83 register MAXD 137. This step 555 initializes register 508. Then at 556 data is formatted to the area which is page limited. Upon the area being filled, formatter 22 at 557 examines to see if there is any additional text coming in the unformatted text data stream. If not, a next control word is accessed; otherwise, at 558 a page is ejected (.CP) which allows formatting named area with a page attribute to the next logical page. At 560, the ADB of NAREA specified in register 515 of FIG. 19 is examined. If the contents of NAREA is 0, or the END bit 541 is set, then at 565 the next control word is examined to see if it is a .IF control word. If not, an error has occurred since there is more text than named area space. Accordingly, recovery is provided via logic path 566—such recovery is beyond the scope of the present description. For a .IF control word, formatter 22 proceeds from step 565 to step 567. Based upon the .IF control word, i.e., examination of whether or not a central area C1 is formatted, for example, the ADB for the named area related to X or Y is accessed. It is to be understood that such ADB is constructed as shown in FIG. 19 but contains different information. That named area is then examined at 568 to determine if it is full. If it is full, recovery is required since it should not have received text and graphics to the fullest extent; otherwise, logic path 562 is followed to step 556, whereupon the steps are repeated until all of the text has been formatted to a series of pages in accordance with the named areas that are connected.

If another area was identified at 560, formatter 22 at 561 resets ADB, adds its MAXD value to the contents of register 508, and then formats data to the area at 556, as previously described.

FIG. 21 shows machine operations inserted into the named area scanning of FIG. 12 for accommodating the page-specific indications for named areas. Step 321 of FIG. 12 is replicated in FIG. 21. When the MESD is not equal to 0 at step 321, i.e., the named area is not empty, then at 575 formatter 22 examines its ADB for determining whether or not a page number has been indicated in register 512 (FIG. 19). If not, step 325 of FIG. 12 is then executed; otherwise, formatter 22 proceeds to step 576 for determining if the current page, as identified in accordance with the DCF Licensed Program, supra, is equal to the page number identified in register 512. If it is, the named area is to be formatted and step 325 is then executed by formatter 22; otherwise, step 322 of FIG. 12 is performed.

While the invention has been particularly shown and described with reference to preferred embodiments thereof, changes in form and details may be made therein without departing from the spirit and scope of the invention.

What is claimed is:

1. In an automatic typographic page formatter having means to receive coded text digital signals, including means to receive formatting commands with said text signals, and formatting means coupled to said receiving means for formatting a page of text using said received text digital signals and in accordance with said received formatting commands;

the improvement including in combination:

first means in said formatting means coupled to said receiving means and being capable of receiving said text digital signals and said formatting commands for assigning said received text digital signals to successive pages of text and indicating ending formatting of each page whereby a document having a plurality of pages of text can be created from said received text digital signals;

said first means including format limiting means for sequentially placing text on each of said successive pages such that successively vertical portions of each page sequentially receive text; and named area control means coupled to said first means and said receiving means for sequentially receiving said text digital signals and said formatting commands and being responsive to named area ones of said formatting commands to select predetermined ones of said text digital signals for insertion onto predetermined ones of said pages of text independently of said first means and said sequence of receipt whereby text inserted by said named area means has a format and page location independent of the said first means sequentially created text format and the sequence of receipt of said text digital signals.

2. The automatic typographic page formatter set forth in claim 1 further including, in combination:

define area means in said named area control means and being coupled to said receiving means to be responsive to second ones of said embedded commands to create named areas for receiving text and graphic digital signals and indicating location thereof, said created named areas including section named areas to be located with respect to predetermined ones of said predetermined portions and page named areas for receiving text and graphic digital signals for text and graphics to be located anywhere on a page being formatted independently of said portions;

section named area means in said named area control means having said section named areas and being coupled to said receiving means to be responsive to first ones of said embedded commands to format received predetermined text and graphic digital signals to section named areas;

page named area means in said named area control means and having page named areas and being coupled to said receiving means to be responsive to said first ones of said embedded commands to format predetermined received text and graphics digital signals to said page named areas; and named area placement means coupled to said page and section named area means and to said first means for being responsive to said first means indicating end of formatting said portions on a page to place text formatted to any of said page named areas on said page just ended and being further responsive to received third ones of said embedded commands to place text formatted to any of said section named areas to said page being formatted to a one of said portions.

3. The automatic typographic page formatter set forth in claim 2 further including, in combination:

named area galley means coupled to said define area means and to said page and section named area means for indicating defined named areas and indicating whether or not either said page or section named area means have formatted text or graphics to the indicated respective named areas;

named area chain means having first chain means for chaining all of said page named areas and second chain means for chaining all of said section named areas and being coupled to said page and section named area means for receiving indications of text being formatted to said page and section named areas, respectively; and scan means coupled to said first and second means and to said named area chain means for being responsive to said first means indicating placement of text and graphics from said page named areas on a page to scan said first chain means for finding all of said page named areas having text or graphics formatted thereto and being coupled to said named area placement means to activate same in response to said scan means finding any page named areas having text or graphics to place such found page named areas to the page and being further responsive to said second means indicating placement of said section named areas to scan said second chain means for activating said named area placement means to place on the page being formatted any section named areas having text or graphics formatted therein.

4. The automatic typographic page formatter set forth in claim 2 wherein said section named area means includes means for limiting placing text digital signals onto a page and further having means coupled to said first means for ending placing of said text signals onto a page for starting a new page based upon text digital signals from a section named area such that a plurality of pages can be formatted via said first means and said section named area means using text signals of said section named areas for determining pagination.

5. The automatic typographic page formatter set forth in claim 4 wherein said section named area means includes maximum depth means for each section named area and having placement means for placing a plurality of text signals from a plurality of section named areas to a single one of said vertical portions on a page and determining the maximum depth of said portion as being the largest maximum text depth of said section named areas.

6. The automatic typographic page formatter set forth in claim 5 wherein said named area placement means includes means for placing text signals from a plurality of said section named areas including means for enabling overlay of such text signals within any single portion of a page and inhibiting overlay of such text signals from said section named areas in diverse ones of said portions.

7. The automatic typographic page formatter set forth in claim 2 wherein said named area control means includes page specifying means coupled to said receiving means and to said named area placement means for responding to a page one of said formatting commands for assigning text signals in a corresponding one of said named areas to a specific page within the document.

8. The automatic typographic page formatter set forth in claim 7 wherein said section named area means includes said page specifying means for specifying text signals from specific ones of said section named areas to specific ones of said pages.

9. The automatic typographic page formatter set forth in claim 2 wherein said define area means includes means for defining a plurality of named areas and said named area means includes means for formatting text signals to a plurality of said named areas and including means in said named area placement means coupled to said receiving means for determining when said text signals formatted to the respective named areas are to be placed on a page including formatting in a sequence other than the sequence of the received text signals.

10. The automatic typographic page formatter set forth in claim 9 further including means in said first means for terminating formatting to a page;

said named area control means being coupled to said terminating means and responsive thereto for scanning predetermined ones of said named areas for identifying formatted text signals stored therein and then placing predetermined portions thereof on the page which said first means had just terminated formatting.

11. The automatic typographic page formatter set forth in claim 9 further including means in said section named area means and coupled to said first means for being responsive to first ones of said embedded commands for terminating the formatting of text signals to any portion of said page currently being formatted and for placing text signals from predetermined ones of said section named areas onto said page beginning at the end of said just-terminated portion and then placing pages said text signals onto said page and ensuing pages from said predetermined ones of said section named areas.

12. The automatic typographic page formatter set forth in claim 11 further including page end means in said section named area means coupled to said placement means and to said first means for monitoring the placement of said text signals onto said page and upon determining terminating placement of said formatted text signals from all of said predetermined ones of said section named areas to said page and actuating said first means to initiate a new page and then to continue placement of said formatted text signals from said predetermined ones of said section named areas until all of the formatted text and graphic signals in the predetermined ones of said section named areas have been placed on said pages.

13. The automatic typographic page formatter set forth in claim 12 further including means in said page named area means coupled to said page end means in said section named area means for being responsive to termination of a page for placing predetermined portions of formatted text signals stored in said page named areas onto the page just terminated.

14. The automatic typographic page formatter set forth in claim 11 wherein said first ones of said embedded commands include one of three possible parameters an ON parameter, OFF parameter and a PUT parameter and said section named area means being responsive to said ON parameter to begin formatting text signals to a section named area and further means being responsive to the OFF parameter to stop formatting text signals to a section named area and further means in said section named area means responsive to said PUT parameter to place the formatted text and graphic signals formatted to a given section named area to a page irrespective of the time said ON and OFF parameters were placed in the received text signals.

15. The automatic typographic page formatter set forth in claim 14 wherein said first ones embedded commands further include a REPLACE, DELETE and TOP parameters and said named area means including means responsive to the REPLACE parameter to delete the predetermined text signals of a predetermined named area and replace same with ensuing text signals received in said text data stream and DELETE means responsive to said delete parameter to erase the formatted text and graphic signals from predetermined named areas and further means coupled to said named area placement means responsive to said TOP parameter to first format ensuing text and graphic signals to a pseudo-named area and then actuating said named area placement means upon completion of said formatting to place the formatted text signals in the pseudo-named area at the top of a predetermined one of said named areas.

16. The automatic typographic page formatter set forth in claim 9 further including means in said named area means coupled to said receiving means for receiving other ones of said embedded commands for concatenating text and graphics formatted to predetermined ones of said named areas when placing same onto a page.

17. The automatic typographic page formatter set forth in claim 1 wherein said named area control means includes section named area control means coupled to said first means and said receiving means for formatting received text signals to section named areas and for placing same onto a page within predetermined ones of said vertical portions; and page/body named control area means in said named area control means coupled to said first means and said receiving means for formatting text signals to an indeterminate length in page or body named areas and having first placement means for placing predetermined ones of said named areas anywhere on the page independent of said portions and having second placement means for placing text signals formatted to body ones of said named areas to body ones of said portions; and means in said first means coupled to said named area control means for indicating which of said portions are body ones of said portions.

18. The automatic typographic page formatter set forth in claim 17 wherein said named area control means includes EOP means coupled to said first means for being responsive to said first means terminating formatting to a page for moving predetermined portions of the text signals formatted to said page and body named areas to a page just terminated, including limiting the transfer of said predetermined text signals to a maximum depth per page such that the text and graphic signals formatted to either the page or body named areas are successfully placed on a plurality of pages independent of the time the text signals were formatted to such named areas.

19. The automatic typographic page formatter set forth in claim 18 wherein said section named area control means includes means for limiting the vertical depth of text and graphic signals to be transferred at any given transfer time from any section named area to a page and including means for repeatedly generating a new portion of text from the transferred text signals on a page equal to such maximum depth and including means coupled to said EOP means for indicating end-of-page processing of text signals from a section named area such that a plurality of pages can be generated from text signals formatted to a single section named area.

20. The automatic typographic page formatter set forth in claim 17 including page end means in said named area control means for identifying pages being formatted with respect to predetermined text formatted to any of said named areas such that the formatted texts are only transferred to such specified pages.

21. The automatic typographic page formatter set forth in claim 20, wherein said page end means includes means coupled to said section named area control means for limiting placement of formatted text signals stored in any of predetermined ones of said section named areas to specific ones of said pages.

22. The automatic typographic page formatter set forth in claim 17, wherein said first one embedded commands selectively include an ON parameter, an OFF parameter, a PUT parameter and means in said section named area control means responsive to the PUT parameter to place all text from predetermined ones of said section named areas onto one or more pages being formatted and said named area control means being responsive to the ON parameter to format ensuing received text signals to a designated named area and having means responsive to the OFF parameter to terminate such formatting of text signals to a named area.

23. The automatic typographic page formatter set forth in claim 17, wherein said named area control means includes define area means coupled to said receiving means for receiving a define area embedded command for establishing parameters for ensuing received text signals to be formatted to a named area define in parameters of said define area command which include width and other typographic parameters independent of the first means formatting; and area control word means in said named area control means coupled to said receiving means for receiving an area control word for beginning formatting of received text and graphic signals to named areas defined by said define area means.

24. The machine-implemented method of composing text and graphics to a plurality of pages for presenting information in a predetermined format, including the machine-executable steps of:

receiving a stream of sequential text/graphics representing digital signals (hereafter text/graphics signals) having embedded control words defining composing functions to be performed, in response to said embedded control words:

dividing each page into a plurality of mutually-exclusive-vertically-separate portions, making each such portion a mutually-exclusive text/graphics-receiving vertical portion of each page;

establishing a plurality of first named areas for having text/graphics placeable anywhere on each page independently of said portions and having a location on the page specific to each such first named area and with each named area being capable of receiving text/graphics signals independently of said portions, each such first named area being capable of receiving an indeterminate extent of said text/graphics signals, assigning a predetermined text/graphics extent from any one of said first named areas to any one of the pages being composed;

while composing predetermined ones of said pages using said portions (1) selectively interleaving formatting said received text/graphics signals to predetermined ones of said first named areas independently of said portions; and (2) determining that a page being composed is to receive text/graphics signals from said first named areas; in response to said determination, scanning all of said first named areas and then placing text/graphics signals composed to any of said first named areas on said page up to said predetermined extent for each respective first named areas;

ejecting the page of formatted text/graphics signals for conversion to a visual presentation; and starting a new page to be composed and repeating all of the above recited steps until all text/graphics signals have been formatted to a plurality of such pages.

25. The machine-implemented method set forth in claim 24 further including the machine-executable steps of:

establishing a plurality of second named areas for receiving text/graphics signals of indeterminate text/graphic extent;

while formatting text/graphics signals to said vertically-separate portions interleaving formatting of said received text/graphics signals to said second named areas, then continuing to format received text/graphics signals to said vertically-separate portions after interleaving formatting of text/graphics signals to one or more of said second named areas; and receiving a first one of said embedded control words for transferring all of the formatted text/graphics signals in said second named areas to a successive ones of said vertically-separate portions beginning at the last vertically-separate portion formatted previously to said received first embedded control word.

26. The method set forth in claim 25, further including the steps of:

when establishing said second named areas specifying which page the section named areas are to be placed upon; and when placing text/graphics signals from a second named areas selecting those text/graphics signals from all of the named areas which do not have a page specifier while limiting the selection of text/graphics signals from the page specified second named areas to said specified pages whereby placement of text and graphics onto a page within a document being composed has a sequence independent of the sequence of receipt of said text/graphics signal.

27. The method set forth in claim 26 further including the steps of:

detecting an end of a page being formatted and in response to said detection, placing text/graphics signals from said first named areas onto said page up to predetermined maximum text/graphics extents for the respective first named areas.

28. The method set forth in claim 27 wherein said division of the page into a plurality of mutually exclusive vertically-separate portions includes a plurality of vertically-adjacent body portions; and establishing said first named areas into page named areas which can be placed anywhere on the page independent of said mutually exclusive vertically-separate portion and having body named areas ones of said first named areas for placement of text/graphics signals onto body ones of said mutually exclusive vertically-separate portions.

29. The method set forth in claim 25 further including the steps of:

defining a plurality of said first and second named areas including parameters of typographic significance; and receiving an area control word as a one of said embedded control words and responding to said receipt by establishing a first named area in accordance with said define named area indicated parameters.

30. The method set forth in claim 24 wherein said dividing step includes establishing a plurality of said mutually-exclusive vertically-separate portions in a sequence in accordance with the sequence of received text/graphics signals and establishing said first named areas by formatting received text/graphics signals thereto independent of said sequential formatting of said portions; and receiving a first embedded control word indicating that the formatting to said mutually-exclusive vertically-separate portions is to stop and that text/graphics signals formatted to said first named areas are to be formatted beginning at the bottom of the last one of said mutually exclusive vertically-separate formatted portions.

31. The method set forth in claim 30 further including the steps of:

monitoring the transfer of said formatted text/graphics signals in a first named area to said page and generating an end-of-page indicator for paginating the names in accordance with said mutually exclusive vertically-separate portions such that a plurality of said pages are formatted based upon the text/graphics signals of said named areas.

32. The method set forth in claim 30 further including the steps of:

when establishing said first named areas specifying which page such named areas are to be placed on when such pages are being formatted in accordance with said mutually exclusive vertically-separate portions.

33. The method set forth in claim 30 wherein each of said first named areas are assigned a maximum depth for each placement on a page such that the text/graphics signals formatted to a named area are placed upon a plurality of said pages as determined by said specified maximum depth.

34. The method set forth in claim 33 including the step of overlapping text/graphics signals of one named area with another named area.

35. The method set forth in claim 33 including the steps of ending a page of said vertically-separate portions when the text/graphics signals from a named area being transferred to a page fill the page and starting a new page with text/graphics signals then transferred from the named area and repeating the steps until all of the text/graphics signals from a named area are placed on a plurality of successive pages.

36. The method set forth in claim 24 wherein said dividing the page follows the sequence of receipt of text/graphics signals such that the page formatting follows the sequence of the received signal; and assigning the predetermined text/graphics extent from any of said first named areas anywhere on the page independent of said mutually exclusive vertically-separate portion and including the step of limiting predetermined ones of said first named areas to body ones of said mutually exclusive vertically-separate portions.

37. The method set forth in claim 36 further including the steps of:

establishing page ones of said first named areas and body ones of said first areas and placing the page ones of said first named areas anywhere on the page independent of any other formatting and placing the body ones of said first named areas only in body ones portions of said mutually exclusive vertically-separate portions independently of any overlap.

38. The method set forth in claim 37 further including the steps of:

when establishing a plurality of said first named areas, selecting predetermined ones of said established first named areas as being specific to predetermined ones of pages being formatted and assigning said predetermined text/graphics extents only to such specified pages.

39. The method set forth in claim 37 further including the steps of:

specifying during said establishing step a maximum depth of text/graphics signals to be placed upon a given page such that text and graphics signals formatted to a given first named area are assigned to a plurality of said plurality of pages in a predetermined order.

40. The method set forth in claim 37 further including the steps of:

establishing a plurality of second named areas; and
assigning the predetermined text/graphics from said second named areas to a series of mutually exclusive vertically-separate portions established after the last mutually-exclusive vertically-separate portion was established through the stream of sequential text/graphics signals in accordance with a predetermined received embedded control word including establishing a plurality of pages receiving all of the text/graphics signals formatted to all of such second named areas.

41. The method set forth in claim 40 further including the steps of:

each time a page is generated based upon text/graphics signals from a second named area, placing predetermined text and graphics from all of said first named areas each time a new page is generated from such second named area text/graphics signals.

42. The method set forth in claim 40 further including the steps of:

for each of the named areas, either the first or second type, establishing a maximum depth of such text/graphics signals for each of the respective pages such that predetermined text/graphics signals from the respective named areas are placed upon respective ones of said pages and including the step of starting a new page based upon text/graphics signals being formatted from said second named areas; and placing text/graphics signals from the first named areas onto the page each time a page is terminated and then only up to the predetermined extent such that the text/graphics from the first and second named areas are placed upon the plurality of successive pages in accordance with said predetermined depths.

43. A computerized composer comprising input means for supplying a sequence of unformatted text/graphics signals with embedded control words which indicate desired composition parameters and composing functions to be performed by a computerized composer, computer means coupled to the input means for receiving said sequence of text/graphics signals and embedded control words for responding to said embedded control words to compose a document based upon the sequence of said text/graphics signals for generating a second sequence of text/graphics signals which are arranged with pagination indications of logical page extents and other composed-page indicating signals for enabling a visual presentation device to present information represented by such text/graphics signals, output means coupled to the computer means for receiving said composed text/graphics signals for visually presenting the composed document;

said computer means having storage means and program indicia for constituting a composing page formatter for enabling the computer means to respond to said received unformatted text/graphics signals in accordance with said embedded control words as follows;

first indicia in said computer means for enabling the computer means to receive said unformatted text/graphics signals and analyze said embedded control words;

second indicia in said computer means for enabling the computer means to couple to said first indicia and to format said unformatted received text/graphics signals in sequence as received including paginating pages in accordance with assignment of text/graphics signals that fill page extents;

third indicia in said computer means for enabling the computer means to respond to named area embedded control words received via said first indicia enablement of the computer means to divert named area indicated ones of the received unformatted text/graphics signals for storage separate from said page formatted text/graphics signals but formatted by said first indicia enablement of the computer means; and fourth indicia in said computer means for enabling the computer means to respond to said received text/graphics signals and to the embedded control words for selectively placing said diverted text/ graphics signals to a said logical page independently of where in the unformatted received text/graphics signals such diverted text/graphics signals were received.

44. The computerized composer set forth in claim 43 wherein said fourth indicia further includes additional fourth indicia for enabling the computer means to select predetermined ones of said text/graphics signals from said separate storage for insertion onto respective predetermined ones of said pages independently of said sequential formatting via said second indicia enablement such predetermined portions of that said diverted text/graphics signals from a single one of said named areas are disposed on a plurality of said logical pages.

45. The computerized composer set forth in claim 44 wherein said second indicia includes additional second indicia for enabling the computer means to sequentially format text/graphics signals to logical pages in top of the page portions, body of the page portion and bottom of the page portions, all of said portions being mutually-exclusive and vertically-separate on each respective logical page.

46. The computerized composer set forth in claim 45 wherein said third indicia includes section named area indicia for enabling the computer means to divert predetermined text/graphics signals into said separate storage for named areas which are placeable on the logical page only within said body portion as a separate independent entity therein; and further including page/body named area indicia for enabling the computer means to divert text/graphics signals for separate storage and formatting to such named areas for placement on said pages independent of said formatted portions.

47. The computerized composer set forth in claim 45 wherein said third indicia further includes page named area indicia for enabling the computer means to divert said text/graphics signals for separate storage into page named areas wherein the diverted text/graphics signals are placeable on a given logical page independent of said portions and for overlaying any of said portions; and said third indicia further including body named area indicia for enabling the computer means to divert other predetermined ones of said text/graphics signals for separate storage into body named areas whereat the formatted text/graphics signals of the body named areas are placeable only in said body portion of said page independent of text/graphics signals formatted to such body portion.

48. The computerized composer set forth in claim 45 wherein said third indicia further includes section named area indicia for enabling the computer means to divert said text/graphics signals from formatting to a page into formatting to a section named area; and said fourth indicia including area put indicia for enabling the computer means to respond to an area put one of said control words for placing said diverted text/graphics signals formatted to a section named area onto said page immediately following the last sequential text formatted to said body portion and for continuing placing all of said diverted text/graphics signals in a section named area to body portions of respectively successive ones of said logical pages until all of the text/graphics signals diverted into such section named areas are placed on a succession of said pages, including enabling the computer means to actuate the second indicia actuate the computer means in accordance with the enablement of said second indicia to paginate pages based upon placement of said diverted text/graphics signals of such section named area.

49. The computerized composer set forth in claim 45 wherein said third indicia includes segmenting indicia for enabling the computer means to receive through the enablement by said first indicia a maximum depth indicator for each page for text/graphics signals diverted to a one of said named areas; and said fourth indicia including limiting indicia for enabling the computer means to respond to said maximum depth indicator to limit the placement on any given page of text/graphics signals which were diverted to a named area to an extent in accordance with said maximum depth whereby such diverted text/graphics signals are segmented among a plurality of said pages.

50. The computerized composer set forth in claim 45 wherein said embedded control words include a define area control word and an activate area control word;

said third indicia including define named area indicia for enabling said computer means to respond to said first indicia receipt of a define area control word to establish in a separate storage a plurality of parameter indicators of the typographic type relating to a named area for receiving diverted text/graphics signals; and further including activate area control word indicia responsive to the embedded activate area control words for selecting predetermined ones of said received unformatted text/graphics signals for diversion for separate storage in accordance with the defined named area and for enabling said computer means to utilize the second indicia for formatting such selected unformatted text/graphics signals to be formatted to said separate storage for later placement on a logical page.

51. The computerized composer set forth in claim 50, further including concatenating indicia within said define area indicia for logically linking named areas in a predetermined sequence such that said diverted text/graphics signals to the individual separate storages for the respective named areas are logically connected independent of the sequence of receipt in the unformatted text/graphics signals and independent of the time of diversion for separate storage for the respective named areas.

52. The computerized composer set forth in claim 50, further including page indicator means in said define area control word and said third indicia including page indicating means for enabling the computer means to respond to the page indicating means for permitting placement of said diverted text/graphics signals only to specific ones of pages; and said fourth indicia including page selecting placement means for enabling the computer means to respond to said page indicating means of said third indicia for managing the placement of said diverted text/graphics signals to a logical page in accordance therewith.

53. The computerized composer set forth in claim 45 wherein said second indicia includes running footer/header indicia for respectively formatting footer and header type of text/graphics signals respectively to the top and bottom of page portions with the formatting continuing through a plurality of pages in the sequence of receipt of such unformatted text/graphics signals;

said third indicia including section named area indicia for placing said diverted text/graphics signals to the section named areas on a plurality of pages including enabling said computer means to use said second indicia enablement for starting a plurality of pages such that said running footer and header text/graphics signals are placed on a plurality of pages in accordance with said second indicia enablement as stimulated by the placement of said diverted text/graphics signals in a section named area.

54. The computerized composer set forth in claim 43 wherein said third indicia includes section named area indicia and page named area indicia respectively for enabling the computer means to divert text/graphics signals to section and page named area portions of said separate storage; and said fourth indicia including section named area placement indicia for enabling the computer means to respond to a put one of said embedded control words to place all of the diverted text and graphics signals to section named areas to a logical page; and further including page named area indicia for enabling the computer means to respond to said paginating to place said diverted text and graphics signals from a page named area to a logical page in accordance with predetermined criteria.

55. The computerized composer set forth in claim 54 wherein said third indicia section named area indicia enables said computer means to place the diverted text and graphics signals on a page independent of the sequentiality of the received unformatted text/graphics signals and once initiating the placement of such diverted text/graphics signals to a page, then sequentially within the section named areas placing all of the diverted text/graphics signals of a section named area to one or more pages in accordance with the second indicia enablement of said computer means.

56. The computerized composer set forth in claim 55 wherein said fourth indicia page named area placement means enables the computer means to respond to pagination of either said second indicia enablement or said section named area placement indicia enablement of the computer means.

57. The computerized composer set forth in claim 56 wherein said third indicia includes page specific indicia for enabling the computer means to respond to received embedded control words having page specifying indications to enable the computer means to place the diverted page/graphics signals using said fourth indicia enablement only to pages specified by said page indications.

58. The computerized composer set forth in claim 43 wherein said embedded control word includes define area control words which define the typographic parameters of a named area and area control words having ON and OFF parameters; and said third indicia in said computer means including define area indicia for enabling the computer means to respond to said define area control words for establishing definitions within the computer means of a named area for receiving diverted text/graphics signals in separate storage, area control word indicia in said third indicia for enabling the computer means to begin diverting said received text/graphics signals in response to an ON parameter and to stop said diversion in response to an OFF parameter for predetermined ones of said named areas.

59. The computerized composer set forth in claim 58 wherein said third indicia further includes replace indicia for enabling the computer means to respond to a replace parameter of an area control word for replacing previously diverted text/graphics signals of a named area with ensuing text/graphics signals being received, delete indicia in said third indicia for enabling the computer means to delete previously diverted text/graphics signals from separate storage of a named area, put indicia in said fourth indicia for enabling the computer means to put all of the diverted text/graphics signals from a plurality of named areas onto a page beginning with the last formatted text/graphics signals from said unformatted text/graphics signals received and formatted in accordance with said second indicia enablement of the computer means and to continue putting all of the diverted text/graphics signals onto the pages in accordance with predetermined criteria on a plurality of pages.

60. The machine-implemented method of composing text and graphics to a plurality of pages for presenting information in a predetermined formatted form, including the machine-executable steps of:

receiving a stream of text/graphics having embedded control words defining composing functions to be performed;

in response to said embedded control words:

dividing each page into a body portion, top formattable portions, and bottom formattable portions, each such portion being a mutually-exclusive text/graphics-receiving vertical portion of each page;

dividing said body portion into a plurality of horizontally-extending, mutually-exclusive, vertically displaced sections;

establishing a plurality of first named areas placeable anywhere on each page independently of said portions and sections with each named area being capable of receiving text/graphics independently of said portions and sections, each such named area capable of receiving an indeterminate extent of text/graphics, assigning a predetermined text/graphics extent from any predetermined ones of said first named areas to any one of the pages being composed;

establishing a plurality of second named areas placeable within predetermined ones of said sections and each such second named area being capable of receiving an indeterminate extent of text/graphics, assigning a predetermined text/graphics extent from each one of said second named areas to any one of said sections;

while composing predetermined ones of said pages being composed when using said portions, selectively interleaving formatting predetermined ones of said first and second named areas independently of said portions using said portions formatting;

while composing certain of said pages being composed by using said portions including some of said predetermined one pages, responding to an AREA PUT control word to end a first section being composed in said body portion so that said first section is a previous section and then scanning said second named areas for text/graphics to be composed to said page in a second section of the body portion, assigning a vertical depth to said second section equal to a maximum vertical depth in a one of said second named areas having text/graphics composed therein into said second section up to said maximum vertical depth and saving any remaining text/graphics from said second named areas for sections yet to be composed;

determining that a page being composed is to be ended (EOP);

in response to said EOP, scanning all of said first named areas and then placing text/graphics composed to any of said first named areas on said page up to said predetermined extent for each respective first named areas;

ejecting the page for visual presentation;

starting a new page to be composed; and repeating all of the above-recited steps until all text/graphics have been composed on a plurality of pages.

61. The method of operating an automatic page formatter having means to receive coded text digital signals and including means to receive formatting commands with said text signals and formatting means coupled to said receiving means for formatting a page of text using said received text signals and in accordance with said received formatting commands;

the improvement including the following steps, in combination:

receiving a first named area command by said formatting means for establishing a named area in like positions in a plurality of successive pages of text for receiving text independently of the remaining portions of the page of text having such named area;

receiving a plurality of said commands and responding thereto for formatting text on successive ones of said pages of text independently of said named area; and receiving second named area commands and responding to said received second named area commands for moving a portion of text positioned on each of said pages and inserting same in the respective named area positioned on such page independently of said plurality of commands.

62. In a page composer, the combination of:

a first text formatter for sequentially formatting and placing first text and graphics onto a succession of logical pages in accordance with first predetermined criteria;

a second text formatter for sequentially formatting second text and graphics to a named area in accordance with second predetermined criteria;

a page control coupled to the first and second text formatters for defining the ending of said logical pages; and text placement means coupled to said first and second text formatters and to said page control for selecting in accordance with third predetermined criteria predetermined portions of said named area formatted second text and graphics for placing such selected text and graphics into respective ones of said logical pages independently of said first text and graphics formatted and placed by said first text formatter whereby the first text formatter formats first text and graphics sequentially to said logical pages and said second text formatter and said text placement means format second text and graphics to said logical pages in a predetermined sequence independently of said first formatter and place such second text and graphics independently of said formatted and placed first text and graphics.

* * * * *